(12) United States Patent
Fraser et al.

(10) Patent No.: US 7,571,794 B2
(45) Date of Patent: Aug. 11, 2009

(54) HYDRAULIC CLUTCH ACTUATION SYSTEM

(75) Inventors: Leigh Fraser, Bilton Rugby (GB); Neil McNab, Wellesbourne (GB); Paul Vincent Rouse, Warwick (GB); Peter Riemer, Leamington Spa (GB); James Antony Lethbridge, Warwickshire (GB); Michael Cooper, Leamington Spa (GB); David Anthony Harries, Sibford Gower Banbury (GB); Melvin Dyke, Wellesbourne (GB)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 324 days.

(21) Appl. No.: 11/433,928

(22) Filed: May 15, 2006

(65) Prior Publication Data

US 2007/0114105 A1 May 24, 2007

(30) Foreign Application Priority Data

May 20, 2005 (DE) ......................... 10 2005 023 209

(51) Int. Cl.
*F16D 25/10* (2006.01)
*F16D 25/12* (2006.01)
(52) U.S. Cl. .................. 192/87.11; 192/85 R; 192/101
(58) Field of Classification Search ........................ None
See application file for complete search history.

(56) References Cited

U.S. PATENT DOCUMENTS

| 6,827,194 | B2 | 12/2004 | Steinel et al. ................. 192/86 |
| 2004/0231943 | A1* | 11/2004 | Berger et al. ............... 192/3.57 |
| 2005/0258014 | A1* | 11/2005 | Berger et al. ............... 192/48.9 |
| 2006/0131123 | A1* | 6/2006 | Grethel et al. .......... 192/85 AA |
| 2007/0007097 | A1* | 1/2007 | Fraser et al. ............. 192/87.13 |

FOREIGN PATENT DOCUMENTS

| EP | 1 236 918 | 9/2002 |
| EP | 1 367 283 | 12/2003 |

* cited by examiner

*Primary Examiner*—Richard M. Lorence
(74) *Attorney, Agent, or Firm*—Davidson, Davidson & Kappel, LLC

(57) ABSTRACT

A hydraulic clutch actuation system having a hydraulic clutch control device which includes at least one clutch master cylinder that communicates via a pressure-medium line with a clutch slave cylinder used for actuating a clutch device, the pressure prevailing in the pressure-medium line being relievable via at least one emergency release valve device to permit disengagement of the clutch device in an emergency situation. The hydraulic clutch actuation system is distinguished in that the emergency release valve device has a seal-carrier device for a sealing element which is movable in response to an electromagnet out of an open position, in which a pressure-medium inlet is open, into a closed position in which the sealing element seals the pressure-medium inlet.

10 Claims, 26 Drawing Sheets

US 7,571,794 B2

HYDRAULIC CLUTCH ACTUATION SYSTEM

This claims the benefit of German Patent Application No. 10 2005 023 209.4, filed May 20, 2005 and hereby incorporated by reference herein.

BACKGROUND INFORMATION

The present invention relates to a hydraulic clutch actuation system having a hydraulic clutch control device which includes at least one clutch master cylinder that communicates via a pressure-medium line with a clutch slave cylinder used for actuating a clutch device, the pressure prevailing in the pressure-medium line being relievable via at least one emergency release valve device to permit disengagement of the clutch device in an emergency situation.

The clutch devices are preferably friction clutches. The hydraulic clutch actuation system is also described as a hydraulic clutch-release system, which includes at least one manually or automatically actuated master cylinder and at least one slave cylinder that disengages a clutch device. In the case of so-called external pressure-operated clutches, the clutch is disengaged in the force-free state of the clutch, and the frictional engagement for connecting an internal combustion engine and a transmission is accomplished by actuation of the slave cylinder and holding the same under pressure via the master cylinder. For twin clutches, in particular, in which a shared input part branches off to two output parts, each having one transmission input shaft, this type of clutch actuation is advantageous. Should both or one of the clutch control devices, also described as clutch release devices, fail, for example due to loss of pressurizing medium, then these clutches remain disengaged and do not lock the transmission, as do clutches, for example, that are normally engaged in the force-free state. In addition to their use in manually operated transmissions, friction clutches of the mentioned type are typically used in automated transmissions, such as in automated manual transmissions (AMT) or twin-clutch transmissions (TCT), which are generally controlled by a control unit, the clutch operation, as well as engagement and disengagement of the gears being automated. Should such a control unit fail, then, depending on the control strategy being used, the situation can arise that the clutch position of one clutch, respectively in a twin-clutch transmission, of both clutches, freezes, with the result that the operation of the internal combustion engine can no longer be controlled independently of the transmission output speed and, thus, of the wheel speed, i.e., in the case of a vehicle at standstill, it is no longer possible to operate the internal combustion engine in order to sustain auxiliary systems. For example, in the event of failure of the transmission control, the pressure prevailing in the pressure-medium line can be relieved by an emergency release valve device in order to disconnect a clutch that no longer disengages.

SUMMARY OF THE INVENTION

An object of the present invention is to devise a simple and cost-effective hydraulic clutch actuation system having a hydraulic clutch control device which includes at least one clutch master cylinder that communicates via a pressure-medium line with a clutch slave cylinder used for actuating a clutch device, the pressure prevailing in the pressure-medium line being relievable via at least one emergency release valve device to permit disengagement of the clutch device in an emergency situation.

The present invention provides a hydraulic clutch actuation system having a hydraulic clutch control device which includes at least one clutch master cylinder that communicates via a pressure-medium line with a clutch slave cylinder used for actuating a clutch device, the pressure prevailing in the pressure-medium line being relievable via at least one emergency release valve device to permit disengagement of the clutch device in an emergency situation, in that the emergency release valve device has a seal-carrier device for a sealing element which is movable in response to an electromagnet out of an open position, in which a pressure-medium inlet is open, into a closed position in which the sealing element seals the pressure-medium inlet. The emergency release valve device is preferably preloaded into the open position in order to ensure an emergency release in the event that the electromagnet fails. In the case of an emergency, the emergency release valve device then opens automatically, in order to disengage the clutch device. In the open position, a connection, also described as a replenishing line, is opened between the pressure-medium inlet and a pressure relief line.

One preferred exemplary embodiment of the hydraulic clutch actuation system is characterized in that the seal-carrier device has a blind hole which is used for accommodating the sealing element and whose inside diameter is larger than the outside diameter of a pressure-medium inlet nozzle. In the closed position, the sealing element engages on the pressure-medium inlet nozzle, in order to seal the same. In the open position, the sealing element is spaced apart from the pressure-medium inlet nozzle, in order to open a connection, also described as a replenishing line, between the pressure-medium line and a pressure-relief line.

In accordance with another preferred exemplary embodiment of the hydraulic clutch actuation system, the seal-carrier device is tiltable in response to an electromagnet out of the closed position into the open position. The tilting motion is effected, for example, by an actuator of the electromagnet that is movable substantially transversely to the seal-carrier device.

Another preferred exemplary embodiment of the hydraulic clutch actuation system provides for a pressure-limiting valve to be integrated in the seal-carrier device. The pressure-limiting valve ensures that the emergency release valve device automatically opens as soon as a predefined pressure level is reached. Moreover, the emergency release valve device may be opened at any time by deenergizing the electromagnet.

In accordance with yet another preferred exemplary embodiment of the hydraulic clutch actuation system, a threaded device is disposed between the seal-carrier device and the electromagnet and is used to convert a rotary motion of the electromagnet into a translational motion of the seal-carrier device. Thus, in response to the rotary motion of the electromagnet, the sealing element, respectively the seal-carrier device, is moved out of the open position into the closed position, and vice versa.

Another preferred exemplary embodiment of the hydraulic clutch actuation system provides for the seal-carrier device to be constituted of a lever device. In this exemplary embodiment, the lever effect is utilized to move the sealing element, respectively the seal-carrier device, out of the open position into the closed position, and vice versa.

Yet another preferred exemplary embodiment of the hydraulic clutch actuation system provides for the seal-carrier device to cooperate with a lever device which is active between the electromagnet and the seal-carrier device. In this exemplary embodiment, an additional lever device is provided in order to move the seal-carrier device, respectively the sealing element, out of the open position into the closed position, and vice versa.

Another preferred exemplary embodiment of the hydraulic clutch actuation system provides for the seal-carrier device to cooperate with a wedge-type device which is active between the electromagnet and the seal-carrier device. In this exemplary embodiment, mutually engaging wedge faces are used in order to move the seal-carrier device, respectively the sealing element, out of the open position into the closed position, and vice versa.

Another preferred exemplary embodiment of the hydraulic clutch actuation system provides for the seal-carrier device to cooperate with an elastic coupling device which is active between the electromagnet and the seal-carrier device. A motion of the electromagnet, respectively of an actuator belonging to the electromagnet, is transmitted via the elastic coupling device to the seal-carrier device.

The present invention also relates to a hydraulic clutch actuation system having a hydraulic clutch control device which includes one first clutch master cylinder that communicates via a first pressure-medium line with a first clutch slave cylinder used for actuating a first clutch device, and one second clutch master cylinder that communicates via a second pressure-medium line with a second clutch slave cylinder used for actuating a second clutch device, the pressure prevailing in the first and/or in the second pressure-medium line being relievable via at least one previously described emergency release valve device to permit disengagement of at least one of the clutch devices in an emergency situation.

BRIEF DESCRIPTION OF THE DRAWINGS

Further advantages and features of the present invention and details pertaining thereto are derived from the following description in which various exemplary embodiments are explained in detail with reference to the drawings. In each case, the features delineated in the claims and the specification may be essential to the present invention, either alone or in any combination. In the accompanying drawings, the figures show:

DETAILED DESCRIPTION OF THE PREFERRED EMBODIMENTS

Figure 1:
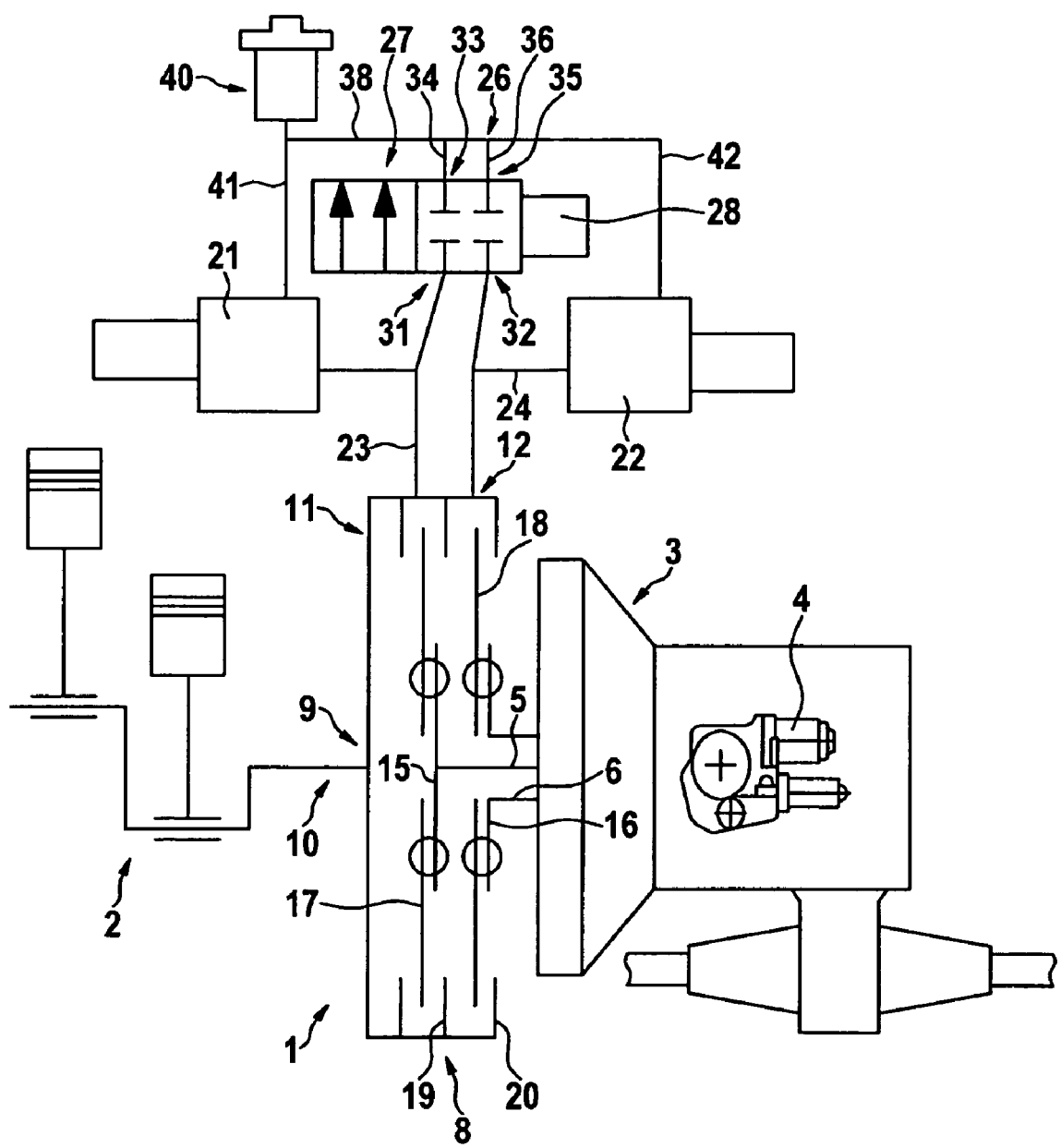
FIG. 1 a schematic representation of a drivetrain of a motor vehicle having a hydraulic clutch actuation system which includes an emergency release valve device having a 4/2-way directional control valve.

FIG. 1 through 7 each show a schematically illustrated drivetrain 1 of a motor vehicle. For the sake of clarity, all of the individual parts of the drivetrain are provided with reference numerals in FIG. 1 only. To improve the legibility of the drawing, only the essential reference numerals are specified in FIG. 2 through 7. The following detailed description of FIG. 1 applies to FIG. 2 through 7 as well. To avoid repetitive explanations, the complete description of the entire drivetrain is not repeated in the detailed description of FIG. 2 through 7. Instead, essentially only the differences among the exemplary embodiments illustrated in FIG. 1 through 7 are discussed.

A drivetrain 1 of a motor vehicle is schematically illustrated in FIG. 1. Drivetrain 1 includes an internal combustion engine 2, which has a downstream transmission 3 that is designed as a twin-clutch transmission having two transmission input shafts 5, 6. Located in the power flow between internal combustion engine 2 and transmission 3 is a twin clutch 8 having an input part 9 which is nonrotationally connected to a crankshaft 10 of internal combustion engine 2. Twin clutch 8 includes a first clutch device 11 and second clutch device 12. The two clutch devices 11 and 12 are preferably designed as friction clutches. In this context, the design and function of a twin clutch having two friction clutches are assumed to be known.

Twin clutch 8 includes two output parts 15, 16, which are each nonrotationally connected to one of transmission input shafts 5, 6. Output parts 15, 16 are each coupled via torsional-vibration dampers to a clutch disk 17, 18. Clutch disks 17, 18 have friction linings which may be brought into frictional engagement with input part 9 of twin clutch 8. 100611 To that end, input part 9 has an axially fixed pressure plate having frictional engagement surfaces on both sides and is nonrotationally connected to axially displaceable annular disk parts 19, 20, which are each provided for one output part, are connected to input part 9, and each have a frictional engagement surface. The frictional engagement with the friction surfaces of output parts 15, 16, respectively of clutch disks 17, 18, is produced by the axial displacement of annular disk parts 19, 20. In the force-free state, the annular surfaces are spaced apart from the pressure plate by leaf springs in such a way that no frictional engagement occurs, i.e., both clutches 11, 12 assigned to output parts 15, 16 are external-pressure operated clutches (also known as active clutches).

Clutches 11, 12 are each engaged by an axial displacement of release or actuation levers. In this context, the release or actuation levers are held in this state with the aid of clutch control devices until a clutch disengagement is desired. An adjusting device may be provided for both clutches 11, 12, one single shared adjusting device being able to act on both clutches. Along the lines of the present invention, it is understood that other clutch forms and embodiments may also be advantageous, such as clutches which in their force free state are engaged, for example.

The two friction clutches 11, 12 are actuated by clutch release or actuation devices, which each cooperate with a slave cylinder designed, for example, as an annular cylinder disposed concentrically about transmission input shafts 5, 6. The slave cylinders each communicate via pressure-medium lines 23, 24 with a master cylinder 21, 22. Master cylinders 21, 22 are each actuated, for example, by an electric actuator.

Depending on the particular need, preferably in the case of an emergency, the pressure prevailing in pressure-medium lines 23, 24 may be quickly reduced via an emergency release valve device 26, which is also described as a pressure-relieving device. Emergency release valve device 26 is externally controlled by the driver, for example. To this end, the driver may have a control device which is constituted, for example, of a selector lever for selecting operating programs of the motor vehicle.

Transmission 3 is actuated, for example, by a transmission actuator 4, which is controlled, in turn, via a transmission control unit. If, in an emergency situation, the transmission control unit fails, then master cylinders 21, 22 remain in their momentary position. As a result, clutches 11, 12 remain in frictional engagement, depending on the position of the corresponding actuating devices. At this point, to enable internal combustion engine 2 to be decoupled from transmission 3, the driver activates the actuating device for emergency release valve device 26, thereby actuating emergency release valve device 26, so that the pressure that has built up in pressure-medium lines 23, 24 is reduced, and clutches 11, 12 are disengaged.

In FIG. 1, emergency release valve device 26 includes a 4/2-way directional control valve 27, which is actuated by an electromagnet 28. 4/2-way directional control valve 27 includes a connection 31 for pressure-medium line 23 and a connection 32 for pressure-medium line 24. On the opposite side, 4/2-way directional control valve 27 has a connection 33 for a pressure-relief line 34 which is connectable via 4/2-way directional control valve 27 to pressure-medium line 23. In addition, 4/2-way directional control valve 27 has a connection 35 for a pressure-relief line 36 which is connectable via 4/2-way directional control valve 27 to pressure-medium line 24. In the position of 4/2-way directional control valve 27 shown in FIG. 1, the connections between pressure-medium lines 23, 24 and pressure-relief lines 34, 36 are interrupted or closed. When 4/2-way directional control valve 27 is switched over to its second position (not shown in FIG. 1), then a connection is opened between pressure-medium lines 23, 24 and the corresponding pressure-relief lines 34, 36, respectively, making it possible to quickly reduce the pressure in pressure-medium lines 23, 24.

Pressure-relief lines 34, 36 communicate via another pressure-relief line 38 with a hydraulic accumulator 40, which is also described as a replenishing reservoir 40 and which has a significantly lower pressure than pressure-medium lines 23 and 24.

In addition, hydraulic accumulator 40 communicates via a connecting line 41, which is also described as a replenishing line, with master cylinder 21. Hydraulic accumulator 40 also communicates via a connecting line 42, which is also described as a replenishing line, with master cylinder 22.

Figure 2:
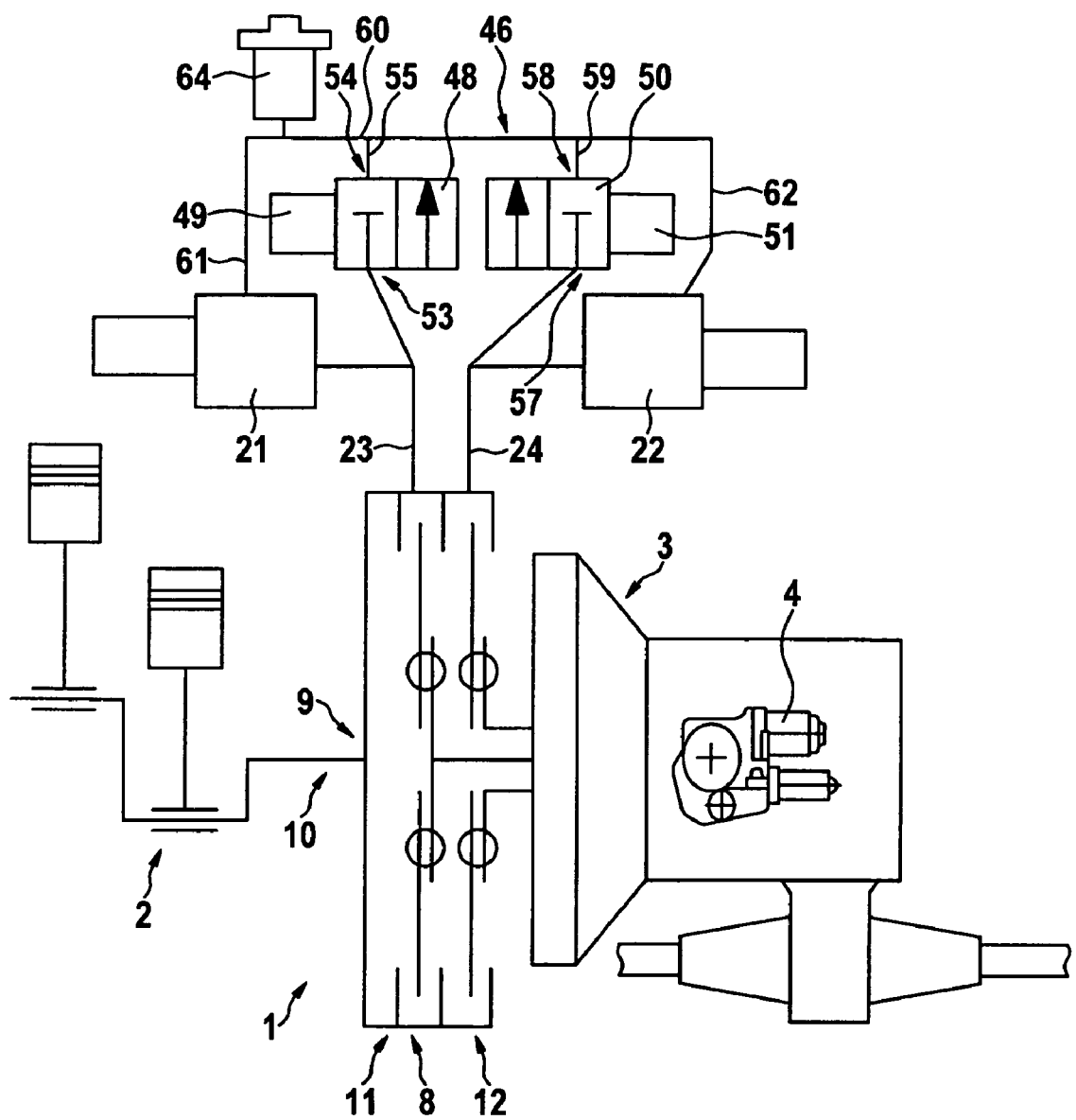
FIG. 2 a schematic representation of a drivetrain of a motor vehicle having a hydraulic clutch actuation system which includes an emergency release valve device having two 2/2-way directional control valves.

In the exemplary embodiment shown in FIG. 2, the hydraulic clutch actuation system includes an emergency release valve device 46 having a first 2/2-way directional control valve 48 that is actuatable by an electromagnet 49 and having a second 2/2-way directional control valve 50 that is actuatable by an electromagnet 51. 2/2-way directional control valve 48 has a connection 53 for pressure-medium line 23. On the opposite side, 2/2-way directional control valve 48 has a connection 54 for a pressure-relief line 55. Similarly, 2/2-way directional control valve 50 has a connection 57 for pressure-medium line 24. On the opposite side, 2/2-way directional control valve 50 has a connection 58 for a pressure-relief line 59. Pressure-relief lines 55 and 59 communicate via a connecting line 60 with a hydraulic accumulator 64. Hydraulic accummulator 64 communicates via a connecting line 61, which is also described as a replenishing line, with master cylinder 21. In addition, hydraulic accumulator 64 communicates via connecting line 60 and a connecting line 62 with master cylinder 22.

Figure 3:
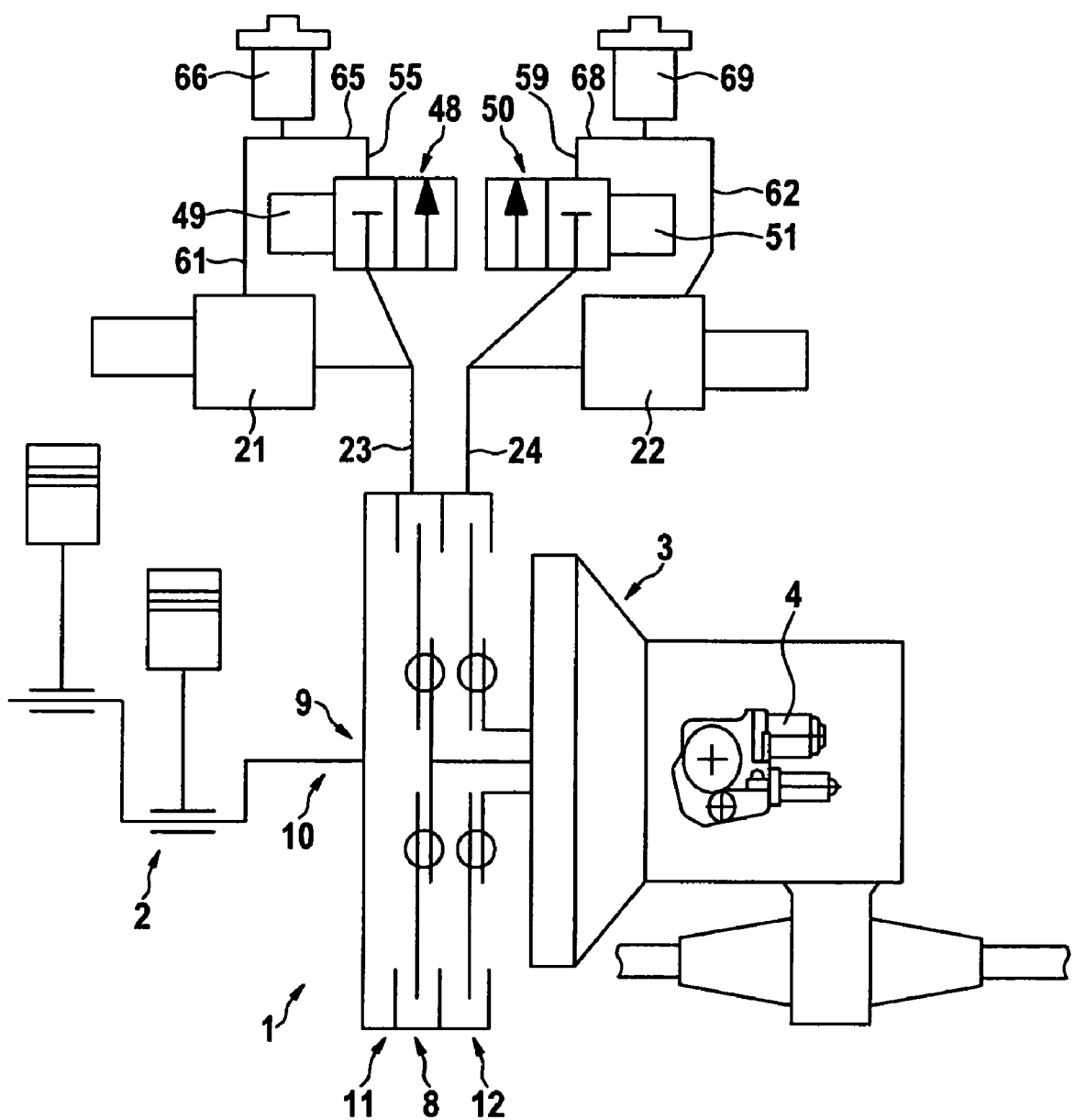
FIG. 3 a schematic representation of a drivetrain of a motor vehicle having a hydraulic clutch actuation system which includes an emergency release valve device having two 2/2-way directional control valves which communicate with different hydraulic accumulators.

In the hydraulic clutch actuation system shown in FIG. 3, 2/2-way directional control valve 48 is connected via pressure-relief line 55 and a connecting line 65 to a hydraulic accumulator 66, which also communicates via connecting line 61 with master cylinder 21. 2/2-way directional control valve 50 is connected via pressure-relief line 59 and a connecting line 68 to another hydraulic accumulator 69, which also communicates via connecting line 62 with master cylinder 22.

Figure 4:
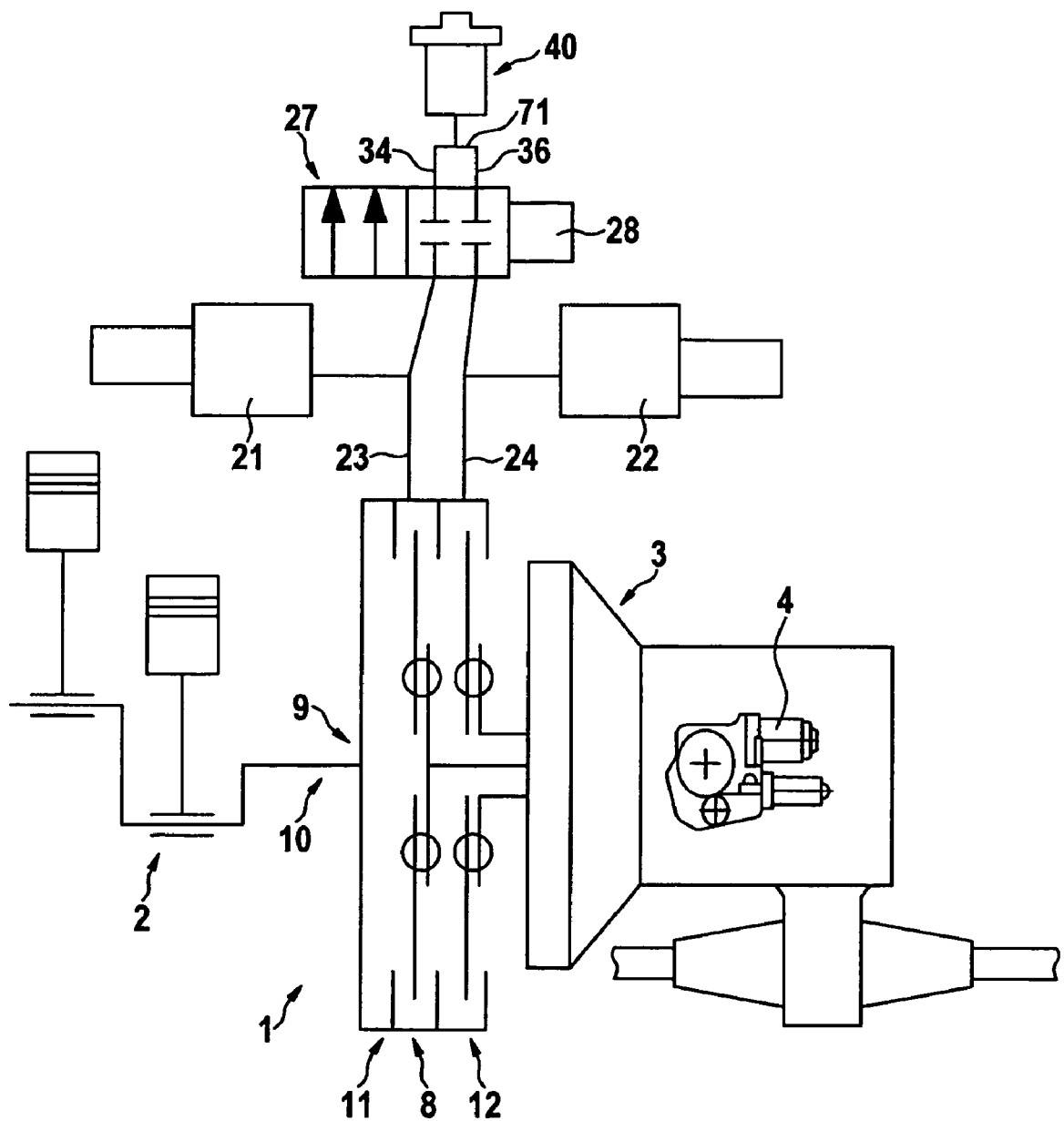
FIG. 4 a schematic representation of a drivetrain of a motor vehicle having a hydraulic clutch actuation system which includes an emergency release valve device having one 4/2-way directional control valve which communicates with one single hydraulic accumulator.

The exemplary embodiment shown in FIG. 4 is similar to that of FIG. 1. 4/2-way directional control valve 27 is connected via pressure-relief lines 34 and 36 and a connecting line 71 to hydraulic accumulator 40. However, in the exemplary embodiment shown in FIG. 4, hydraulic accumulator 40 does not communicate via connecting lines (41 and 42 in FIG. 1) with master cylinders 21 and 22.

Figure 5:
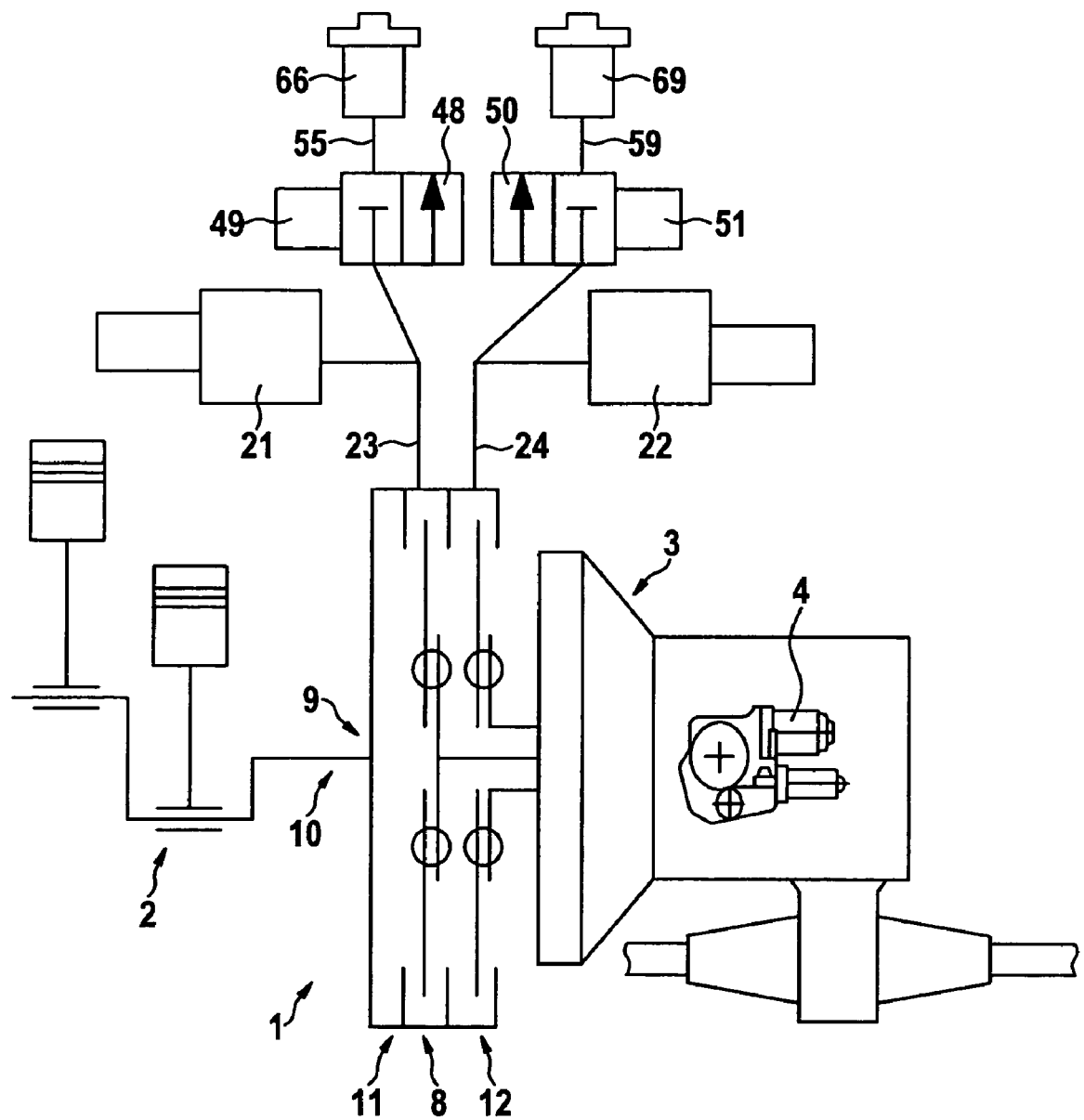
FIG. 5 a schematic representation of a drivetrain of a motor vehicle having a hydraulic clutch actuation system which includes an emergency release valve device having two 2/2-way directional control valves which each communicate with one hydraulic accumulator.

The exemplary embodiment shown in FIG. 5 is similar to that of FIG. 3. However, in the exemplary embodiment shown in FIG. 5, hydraulic accumulators 66 and 69 do not communicate with master cylinders 21 and 22. Thus, in comparison to the exemplary embodiment shown in FIG. 3, the connecting lines (61 and 62 in FIG. 3) between master cylinders 21 and 22 and hydraulic accumulators 66 and 69 are omitted.

Figure 6:
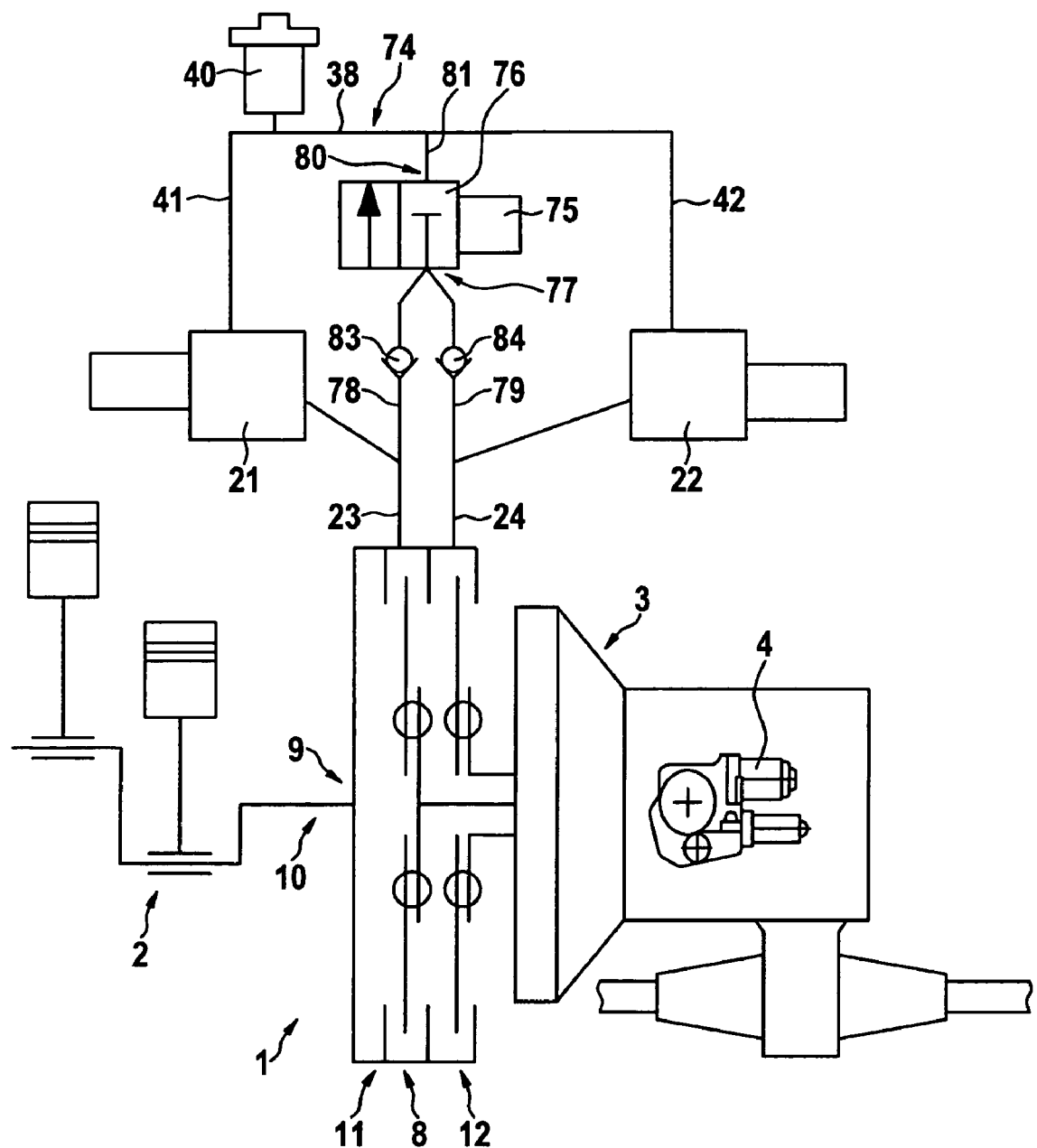
FIG. 6 a schematic representation of a drivetrain of a motor vehicle having a hydraulic clutch actuation system which includes an emergency release valve device having one 2/2-way directional control valve which has one shared connection for two pressure-medium lines.

The hydraulic clutch actuation system shown in FIG. 6 includes an emergency release valve device 74 having a 2/2-way directional control valve 76 that is actuatable by an electromagnet 75. 2/2-way directional control valve 76 has a shared connection 77 for two branch lines 78 and 79. Branch line 78 originates at pressure-medium line 23. Branch line 79 originates at pressure-medium line 24. On the opposite side, 2/2-way directional control valve 76 has a connection 80 for a connecting line 81 which communicates via pressure-relief line 38 with hydraulic accumulator 40.

Branch line 78 features a nonreturn valve 83 which prevents a backflow of medium into pressure-medium line 23. Similarly, branch line 79 features a nonreturn valve 84 which prevents a backflow of medium into pressure-medium line 24.

Figure 7:
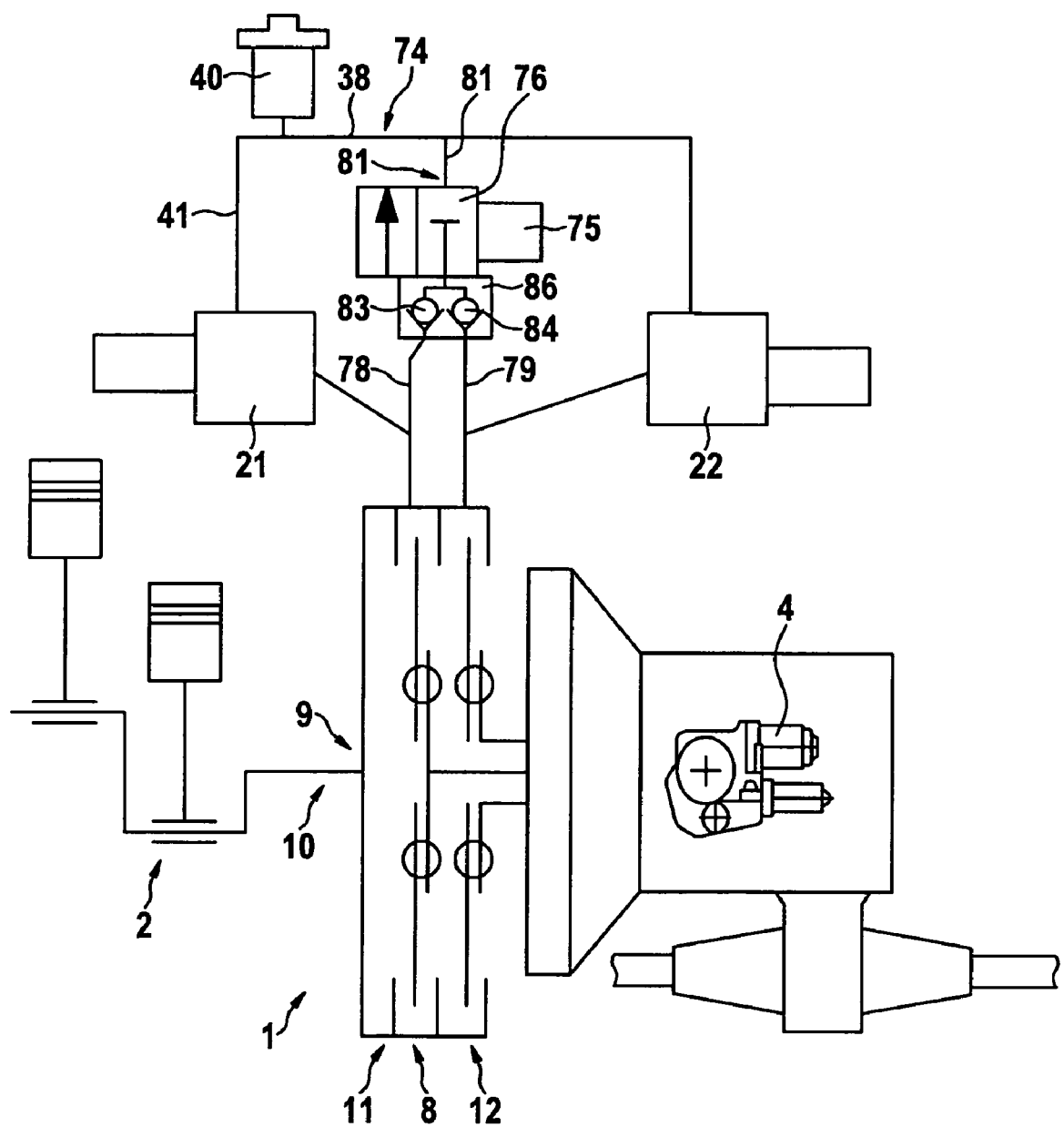
FIG. 7 a schematic representation of a drivetrain of a motor vehicle having a hydraulic clutch actuation system which includes an emergency release valve device having a 2/2-way directional control valve in which two nonreturn valves are integrated.

The exemplary embodiment illustrated in FIG. 7 is similar to that of FIG. 6. In contrast to the exemplary embodiment shown in FIG. 6, in the exemplary embodiment illustrated in FIG. 7, the two nonreturn valves 83 and 84 are combined with 2/2-way directional control valve 76, as indicated by a frame structure 86 adjoining 2/2-way directional control valve 76.

Figure 8:
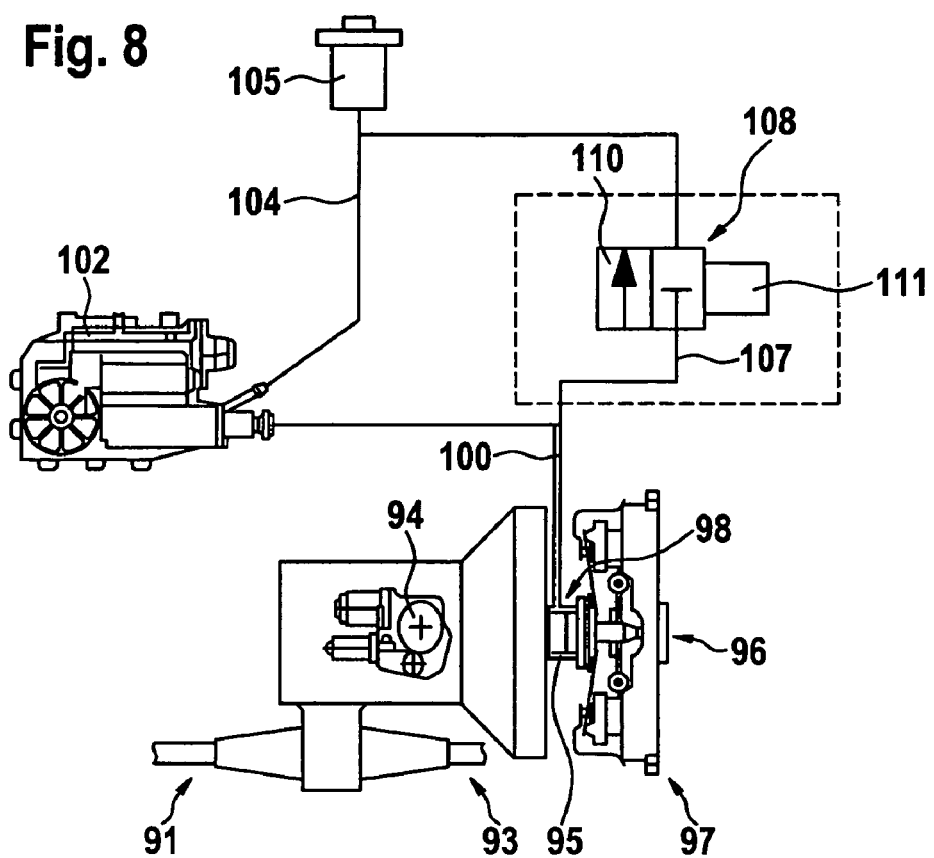
FIG. 8 a schematic representation of a drivetrain of a motor vehicle having a hydraulic clutch actuation system for a single clutch which includes an emergency release valve device having a 2/2-way directional control valve.

A drivetrain 91 of a motor vehicle is schematically illustrated in FIG. 8. Drivetrain 91 includes a transmission 93 which is actuatable by a transmission actuator 94. Transmission 93 includes a transmission input shaft 95. Interposed between transmission 93 and an internal combustion engine (not shown) is a friction clutch 97 which has an input part 96. In contrast to the preceding exemplary embodiments, friction clutch 97 is designed as a single clutch. Friction clutch 97 is actuated with the aid of a slave cylinder 98 which communicates via a pressure-medium line 100 with a master cylinder 102. Master cylinder 102 communicates via a replenishing line 104 with a hydraulic accumulator 105 which has a lower prevailing pressure than pressure-medium line 100.

Pressure-medium line 100 communicates via a pressure-relief line 107, in which an emergency release valve device 108 is installed, with hydraulic accumulator 105. Emergency release valve device 108 has a 2/2-way directional control valve 110, which is actuatable by an electromagnet 111.

In the position of 2/2-way directional control valve 110 shown in FIG. 8, a connection of pressure-medium line 100 via pressure-relief line 107 and 2/2-way directional control valve 110 to hydraulic accumulator 105 is interrupted. In response to 2/2-way directional control valve 110 moving into its second position, the connection from pressure-medium line 100 via pressure-relief line 107 to hydraulic accumulator 105 is opened, thereby reducing the pressure prevailing in pressure-medium line 100. 2/2-way directional control valve is preferably preloaded into its open position and is switched with the aid of electromagnet 111 into its closed position to make normal vehicle operation possible.

Figure 9:
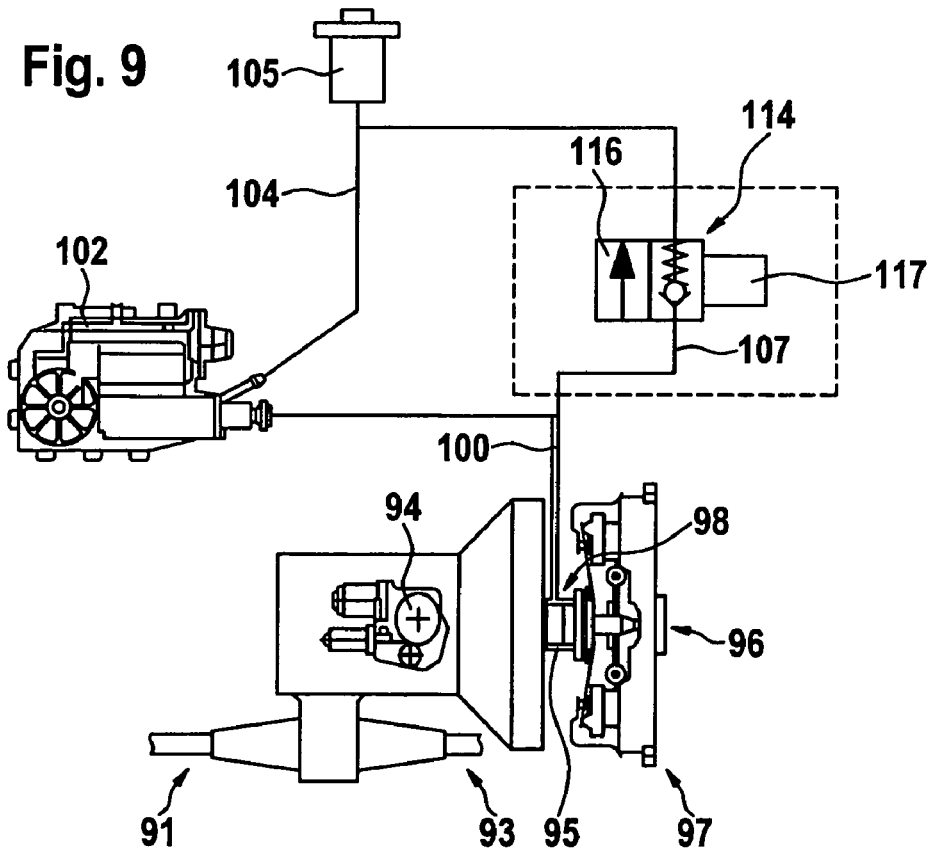
FIG. 9 a schematic representation of a drivetrain of a motor vehicle having a hydraulic clutch actuation system for a single clutch which includes an emergency release valve device having a 2/2-way directional control valve including an integrated nonreturn valve.

The exemplary embodiment illustrated in FIG. 9 is similar to that of FIG. 8. The same reference numerals are used to identify equivalent parts. To avoid repetitive explanations, reference is made to the preceding description of FIG. 8. In the following, only the differences between the two exemplary embodiments are discussed in detail.

The hydraulic clutch actuation system shown in FIG. 9 includes an emergency release valve device 114 having a 2/2-way directional control valve 116 that is actuatable by an electromagnet 117. In contrast to the preceding exemplary embodiment, in the exemplary embodiment illustrated in FIG. 9, a nonreturn valve is integrated in valve 116. This allows pressure to be relieved in pressure-medium line 100 in the closed state of directional control valve 116, as soon as a predefined pressure level is exceeded in pressure-medium line 100. Thus, emergency release valve device 114 additionally has a pressure-limiting valve function.

Figure 10:
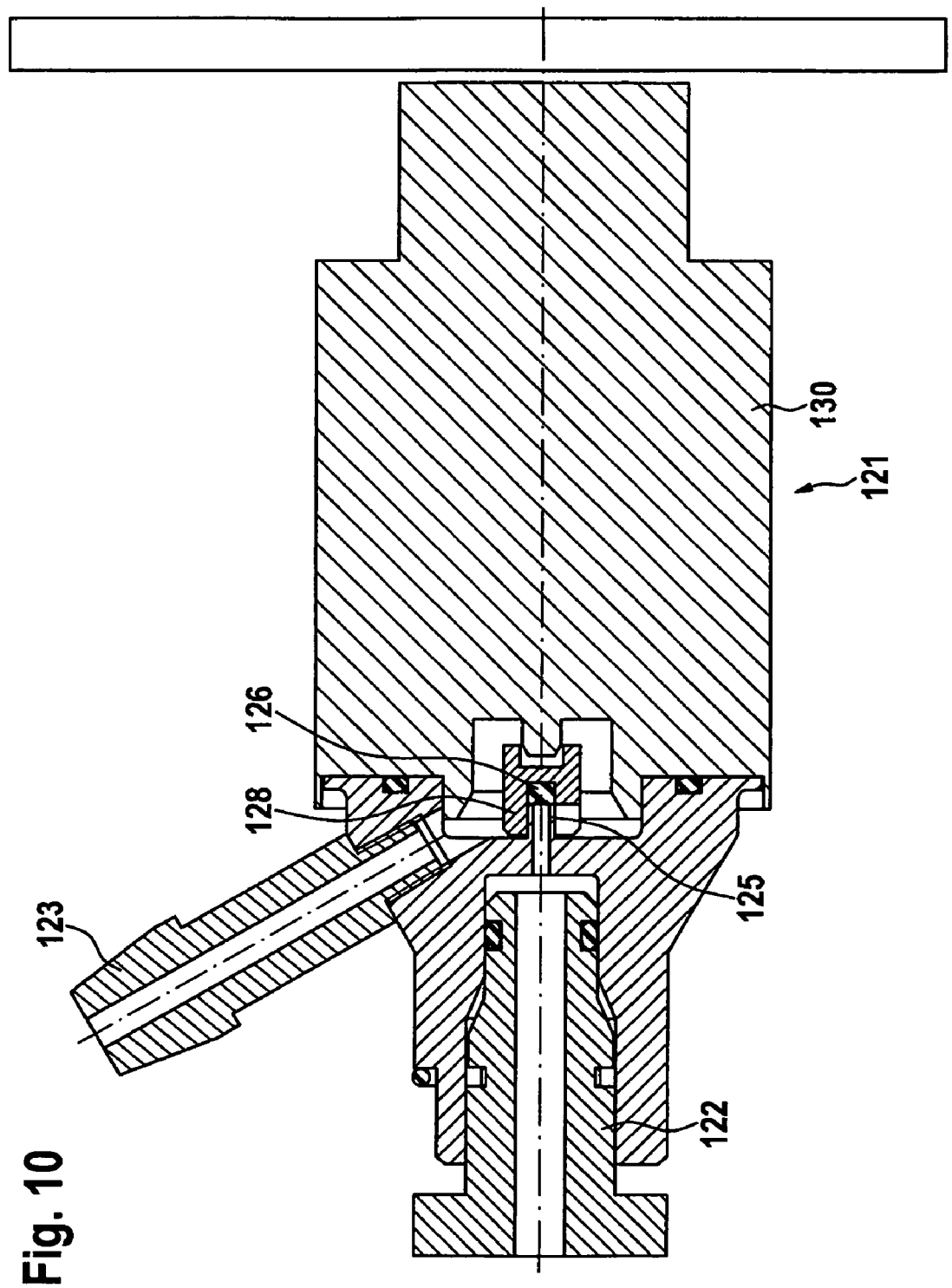
FIG. 10 a sectional representation of an emergency release valve device having a reciprocatingly movable seal-carrier device.

FIG. 10 shows a section through an emergency release valve device 121 which has a connection 122, also described as a pressure connection, for a pressure-medium line. In addition, emergency release valve device 121 has a connection 123 for a return line, also described as a pressure-relief line. Pressure-line connection 122 is connected to a pressure-medium inlet nozzle 125 that projects into the interior of emergency release valve device 121. The orifice of pressure-medium inlet nozzle 125 is sealable by a sealing element 126 that is accommodated in a blind hole that has been recessed into a seal-carrier device 128. The inside diameter of the blind hole is somewhat larger than the outside diameter of pressure-medium inlet nozzle 125. Seal-carrier device 128 is in its closed position which is reached in response to energization of an electromagnet 130. Upon deenergization of electromagnet 130, the pressure in the pressure line causes sealing element 126, together with seal-carrier device 128, to lift off from pressure-medium inlet nozzle 125, opening a connection between pressure connection 122 and return connection 123.

Figure 11:
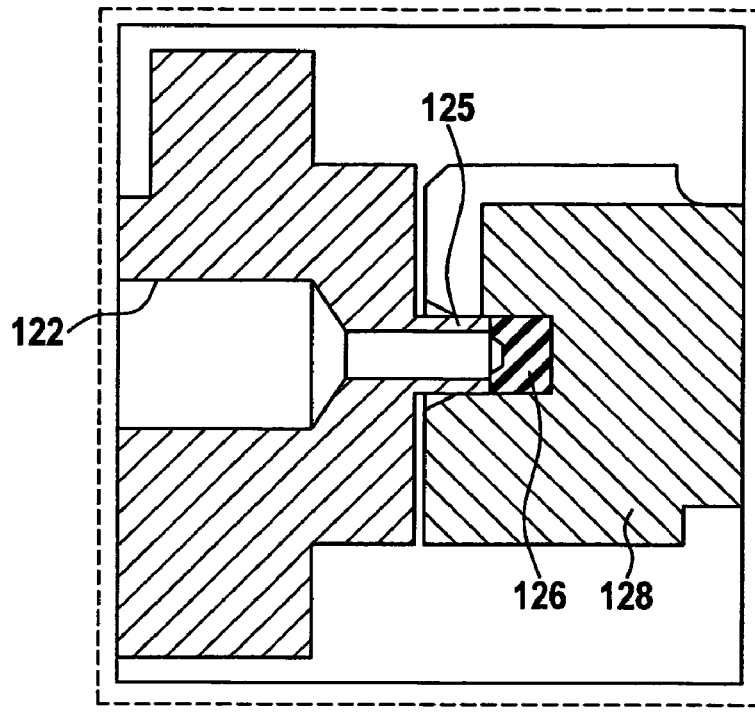
FIG. 11 an enlarged detail from FIG. 10.
Figure 12:
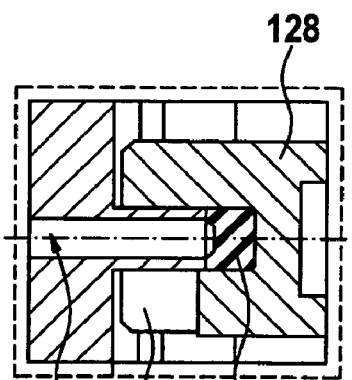
FIG. 12 an enlarged detail from FIG. 11.
Figure 13:
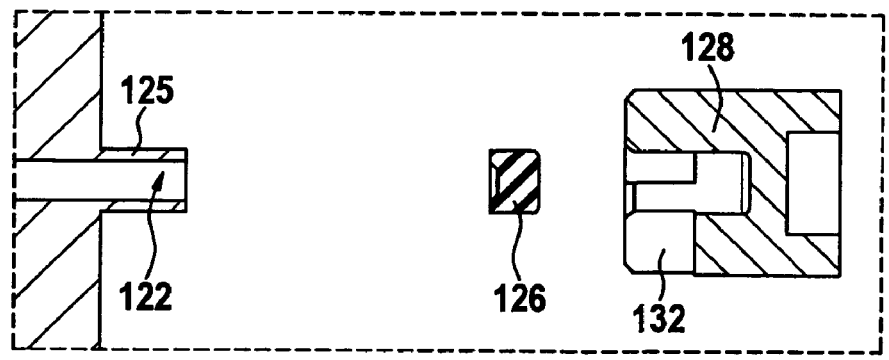
FIG. 13 an exploded view of the individual parts from FIG. 12.

FIG. 11 shows an enlarged detail from FIG. 10. In FIG. 11, it is discernible that the sealing element, which is also described as seal element, has a circumferential contact face for pressure-medium inlet nozzle 125. It is discernible in the sectional view of FIG. 12 that seal-carrier device 128 has a connecting channel 132 which extends transversely and outwardly from the blind hole in which sealing element 126 is accommodated. As soon as sealing element 126 lifts off from pressure-medium outlet nozzle 125, pressurized medium arrives from pressure connection 122 via connecting channel 132 into return connection 123. An exploded view of the individual parts from FIG. 12 is shown in FIG. 13.

Figure 14:
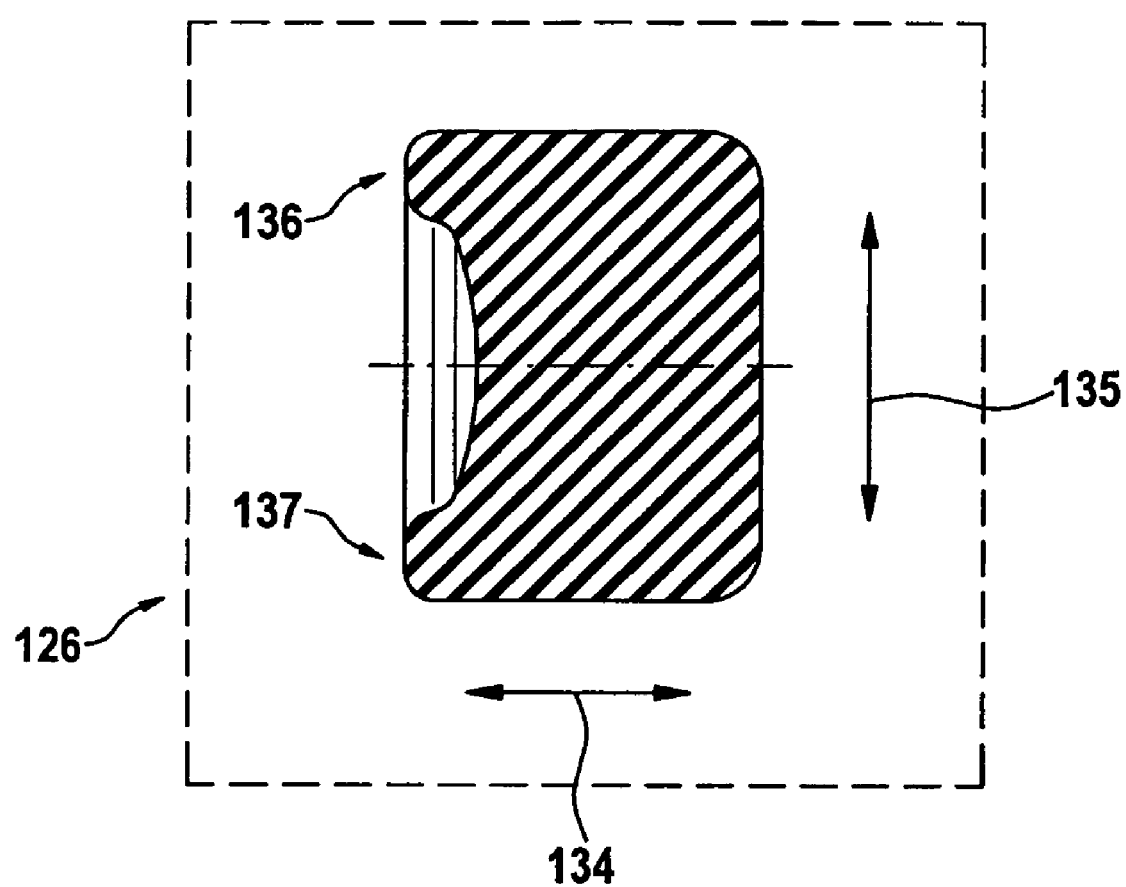
FIG. 14 an enlarged representation of a sealing element of the emergency release valve device shown in FIG. 10 through 13.

In FIG. 14, sealing element 126 is shown in an enlarged plan view. The axial direction is indicted by a double arrow 134. The radial direction is indicted by a double arrow 135. In the enlarged view, it is discernible that sealing element 126 has a circumferential, profiled sealing surface 136, 137 for the pressure-medium inlet nozzle. Sealing element 126 is preferably made of rubber and advantageously has only a relatively small surface area that is exposed to the hydraulic pressure from the pressure-medium line. Due to its shape, sealing element 126 is, in fact, advantageously deformable in order to ensure a perfect sealing seat, but it cannot be pushed away from the surface to be sealed.

Figure 15:
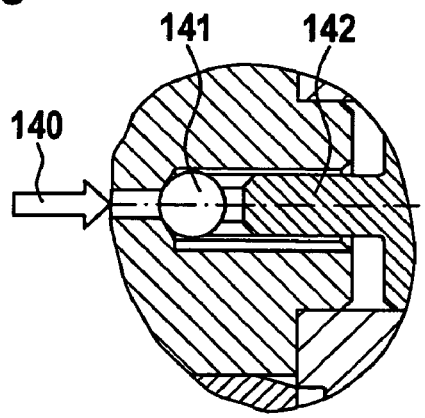
FIG. 15 a detail of an emergency release valve device having a nonreturn valve ball.

FIG. 15 shows a detail of an emergency release valve device which, as indicated by an arrow 140, is connected to a pressure-medium line. Pressurizing medium is prevented from entering by a valve ball that may be made of rubber or of steel, for example. Valve ball 141 is actuated with the aid of an actuator element 142 of an electromagnet.

Figure 16:
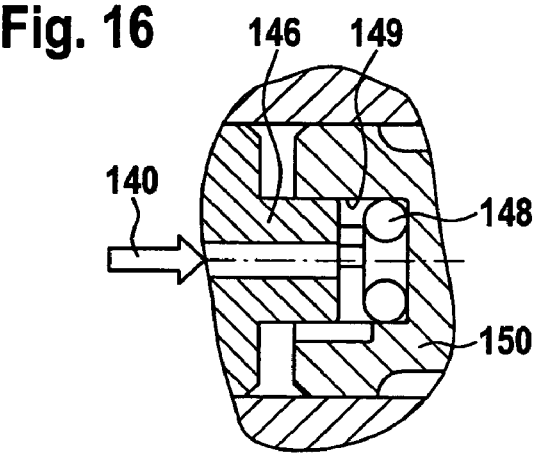
FIG. 16 a detail of an emergency release valve device having an O-ring seal.

FIG. 16 shows a detail of an emergency release valve device which, as indicated by an arrow 140, is connected to a pressure-medium line. The pressurizing medium enters at a pressure-medium inlet nozzle 146 that is sealable by an O-ring seal 148. 0-ring seal 148 is located in a blind hold 149 of a seal-carrier device 150.

Figure 17:
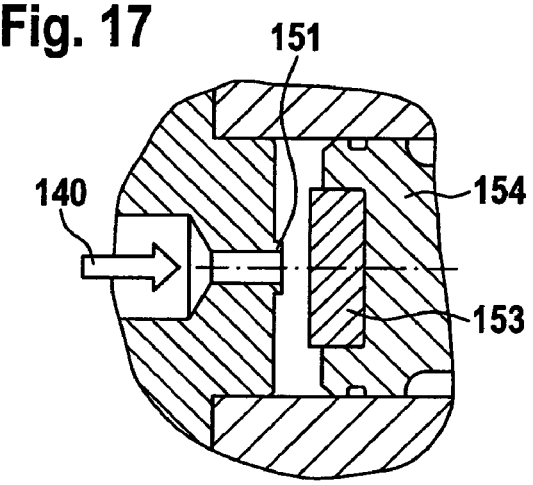
FIG. 17 a detail of an emergency release valve device having an annularly raised portion.

FIG. 17 shows a detail of an emergency release valve device which, as indicated by an arrow 140, is connected to a pressure-medium line. The pressurizing medium arrives through a pressure-medium inlet nozzle, which has an annularly raised portion 151, into the interior of the emergency release valve device. The pressure-medium inlet nozzle having annularly raised portion 151 is sealable by a substantially circular disk-shaped sealing element 153. Sealing element 153 is partially accommodated in a seal-carrier device 154 that is movable toward raised portion 151 in response to an electromagnet.

Figure 18:
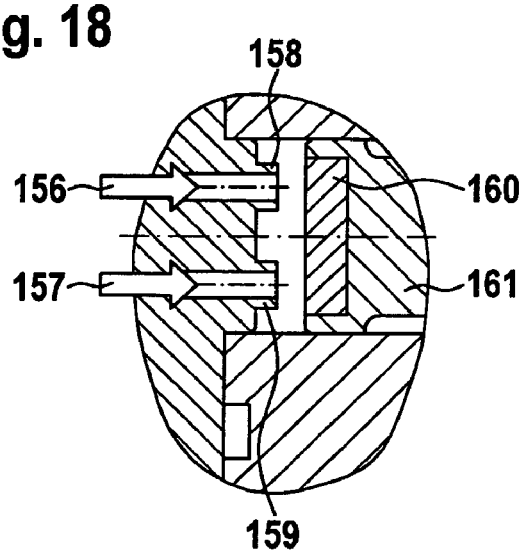
FIG. 18 a detail of an emergency release valve device similar to that in FIG. 17, having two pressure-medium inlets.

FIG. 18 shows an emergency release valve device which, as indicated by two arrows 156 and 157, is connected to two pressure-medium lines. Annularly raised portions 158 and 159 are provided in the entry region of the pressurizing medium. The two annularly raised portions 158 and 159 may be sealed by one single sealing element 160 which is accommodated in a seal-carrier device 161.

Figure 19:
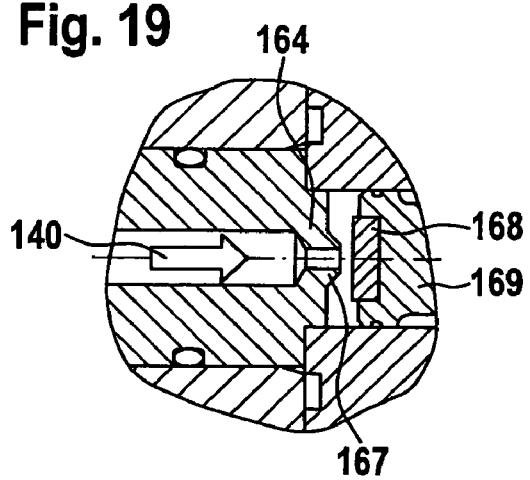
FIG. 19 a detail of an emergency release valve device having a chamfered, raised portion.

FIG. 19 shows a detail of an emergency release valve device which, as indicated by an arrow 140, is connected to a pressure-medium line. The pressurizing medium arrives through a pressure-medium inlet nozzle 164 into the interior of the emergency release valve device. In the interior, pressure-medium inlet nozzle 164 has an annularly raised portion 167 which, radially outwardly, is flattened. Pressure-medium inlet nozzle 164 is sealable by a sealing element 168 that is accommodated in a seal-carrier device 169.

Figure 20:
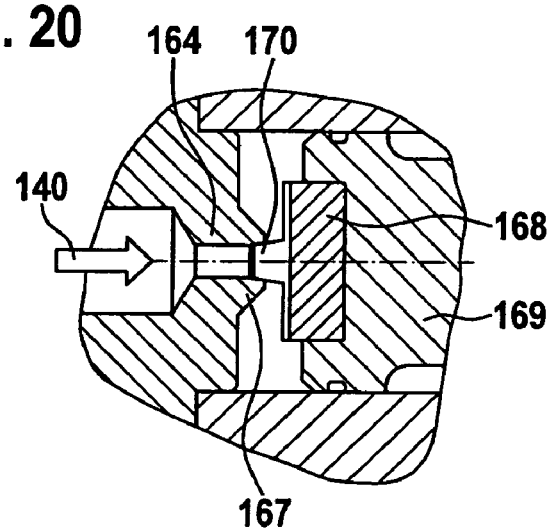
FIG. 20 a detail of an emergency release valve device having a plug-type closure member.

FIG. 20 shows a detail of an emergency release valve device which, as indicated by an arrow 140, is connected to a pressure-medium line. The pressurizing medium arrives in the interior of emergency release valve device through a pressure-medium inlet nozzle 164, which, inside of the emergency release valve, has an annularly raised, radially outwardly flattened portion 167. Pressure-medium inlet nozzle 164 is sealable by a plug-type closure member 170 which is formed on sealing element 168 accommodated in a seal-carrier device 169.

Figure 22:
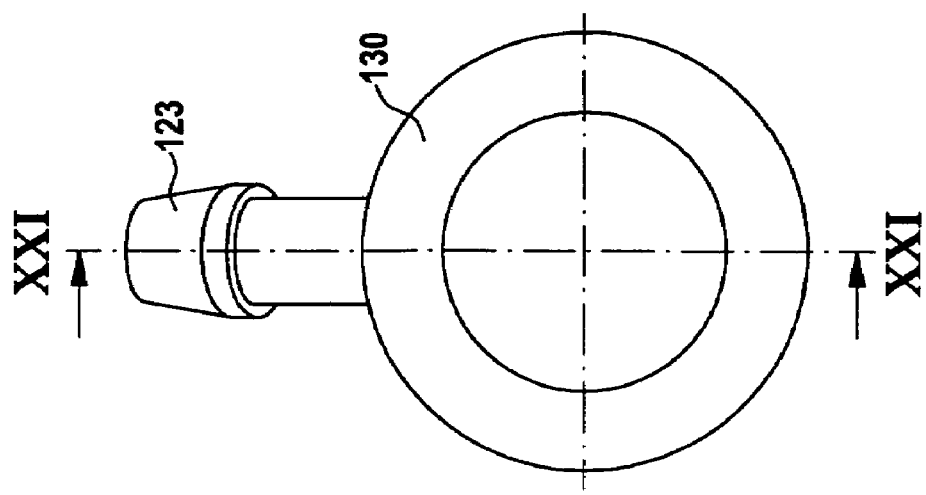
FIG. 22 a side view of the emergency release valve device from FIG. 21.
Figure 21:
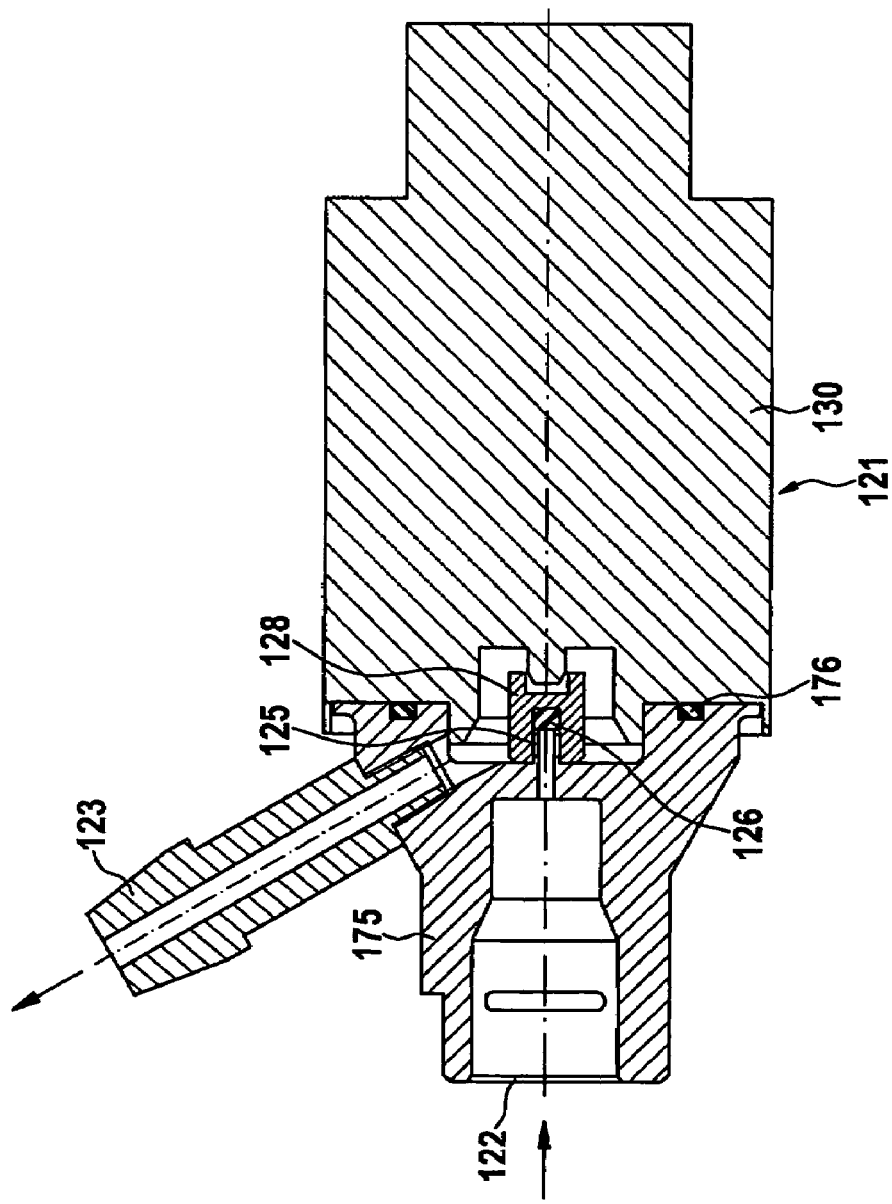
FIG. 21 an emergency release valve device similar to that in FIG. 10.

FIG. 21 shows an emergency release valve device similar to that in FIG. 10. The same reference numerals are used to identify equivalent parts. To avoid repetitive explanations, reference is made to the preceding description of FIG. 10. The emergency release valve device includes a housing 175 which is sealed from the environment with the aid of a seal 176 disposed between housing 175 and electromagnet 130. In FIG. 22, the emergency release valve device from FIG. 21 is shown in a side view from the right.

Figure 24:
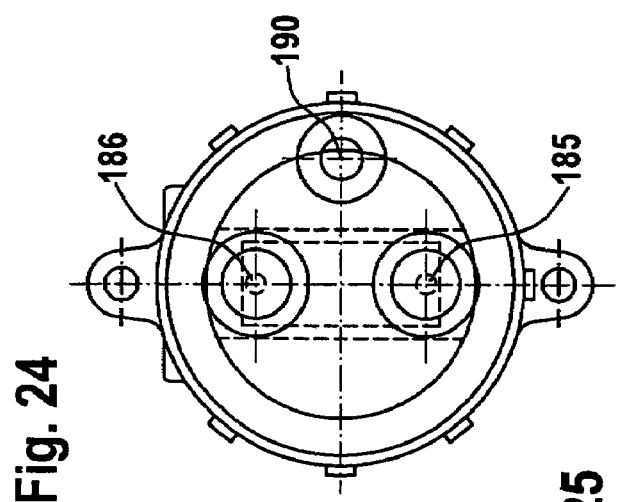
FIG. 24 a side view of the emergency release valve device from FIG. 23.
Figure 23:
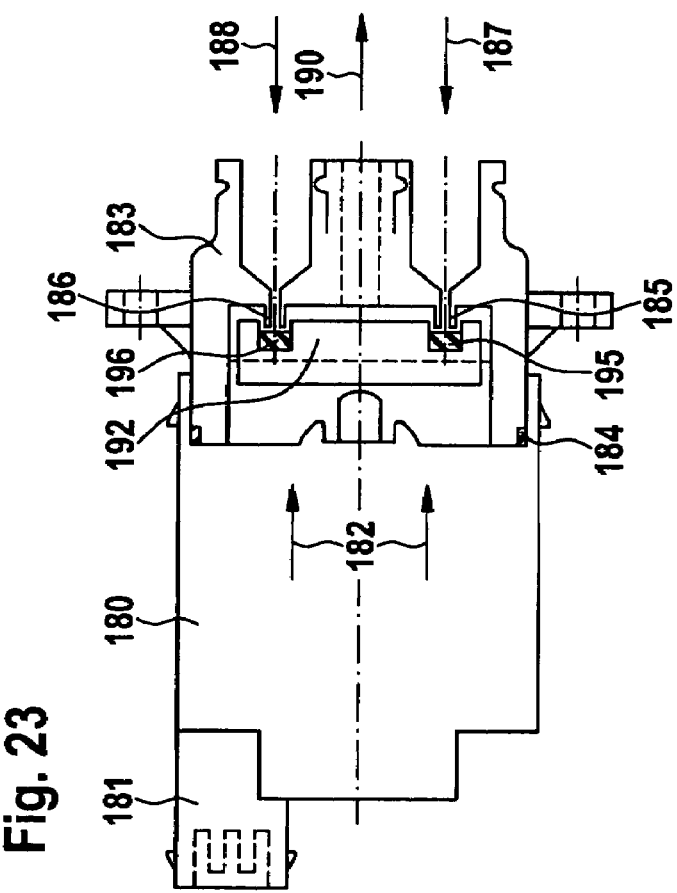
FIG. 23 an emergency release valve device similar to that in FIG. 10 and 21, having two pressure-medium inlet nozzles.

In FIGS. 23 and 24, an emergency release valve device having an electromagnet 180 is shown in different views. Electromagnet 180 has an electrical connection 181 that may be used to energize the electromagnet 180. Arrows 182 indicate a motion executed by electromagnet 180 in response to being energized.

The emergency release valve device shown in FIG. 23 and 24 has a housing 183 that is secured to electromagnet 180, or vice versa. Disposed between electromagnet 180 and housing 183 is a seal 184. Housing 183 has two pressure-medium inlet nozzles 185, 186, which project into the interior of housing 183. Pressure-medium inlet nozzles 185, 186 are connected to pressure-medium lines, as indicated by arrows 187 and 188. Another arrow 190 indicates that the interior chamber of housing 183 communicates with a pressure-relief line, which is also described as a return line.

Inside of housing 183, a seal carrier 192 is movable in response to electromagnet 180 out of an open position into a closed position. Seal carrier 192 has two blind holes in each of which one sealing element 195, 196 is accommodated. Sealing elements 195 and 196 are used for sealing pressure-medium inlet nozzles 185 and 186 when seal carrier 192 is in its closed position in the energized state of electromagnet 180.

Figure 25:
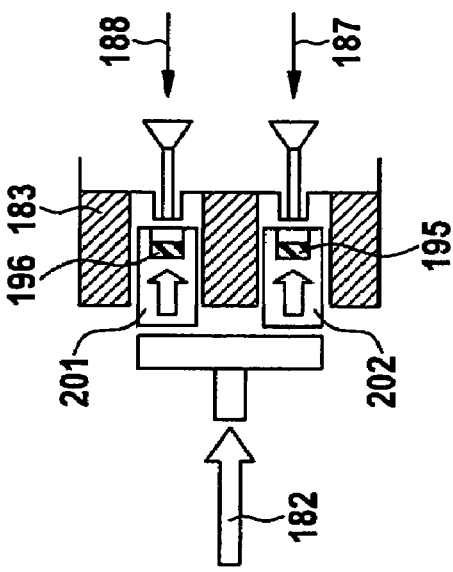
FIG. 25 a variant of the emergency release valve device shown in FIG. 23.

FIG. 25 reveals that sealing elements 195 and 196 may also be accommodated in separate seal-carrier devices 201 and 202. Otherwise, the exemplary embodiment illustrated in FIG. 25 corresponds to that in FIG. 23 and 24.

Figure 26:
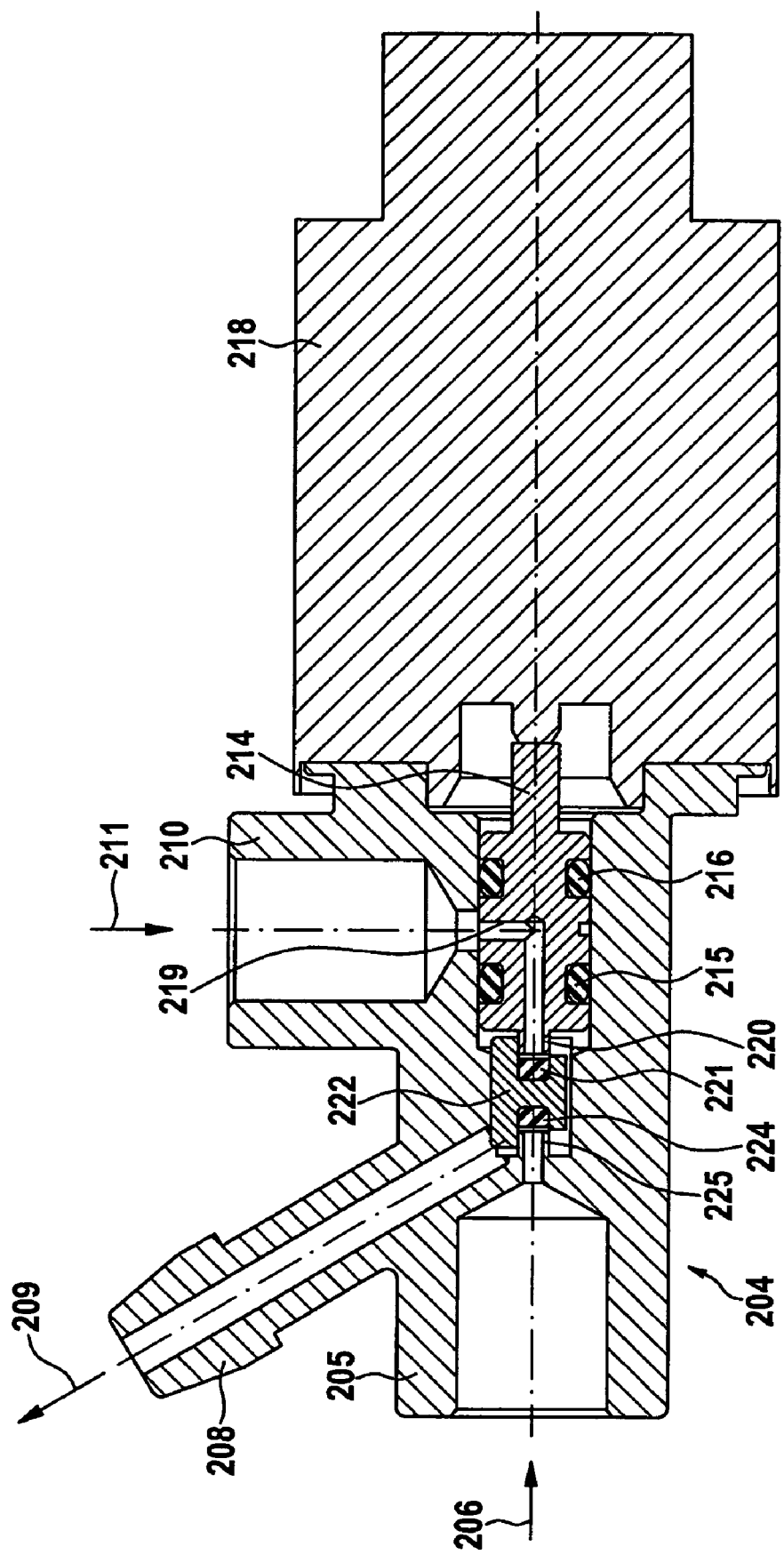
FIG. 26 an emergency release valve device having a valve plunger disposed between a seal-carrier device and an electromagnet.

FIG. 26 shows an emergency release valve device which has a housing 204. Housing 204 features a pressure connection 205 for a pressure-medium line, as indicated by an arrow 206. In addition, housing 204 features a connection 208 for a pressure-relief line that is also referred to as a return line and is indicated by an arrow 209. Moreover, housing 204 features another pressure connection 210 which communicates with an additional pressure-medium line, as indicated by an arrow 211.

Reciprocatingly accommodated in housing 204 in a corresponding bore is a valve plunger 214 having sealing elements 215 and 216. In response to an electromagnet 218, valve plunger 214 is axially movable between an open position and a closed position. Valve plunger 214 has a through channel 219 which links pressure connection 210 to a pressure-medium inlet nozzle 220 on the end face of valve plunger 214 facing away from electromagnet 218. Pressure-medium inlet nozzle 220 is sealable by a sealing element 221 that is accommodated in a seal carrier 222. Also accommodated in seal carrier 222 is another sealing element 224 which is sealable by an additional pressure-medium inlet nozzle 225 that communicates with pressure connection 205. Upon energization of electromagnet 218, valve plunger 214 is moved toward seal-carrier device 222. Seals 221 and 224 are thereby pressed against pressure-medium inlet nozzles 220 and 225, sealing the same. Seals 215 and 216, preferably designed as 0-rings, prevent unwanted fluid leakage. Electromagnet 218 is sealed off internally. Upon deenergization of electromagnet 218, electromagnet 218 returns to its open position and allows pressurizing medium to flow from pressure connections 205 and 210 to pressure-relief connection 208.

Figure 27:
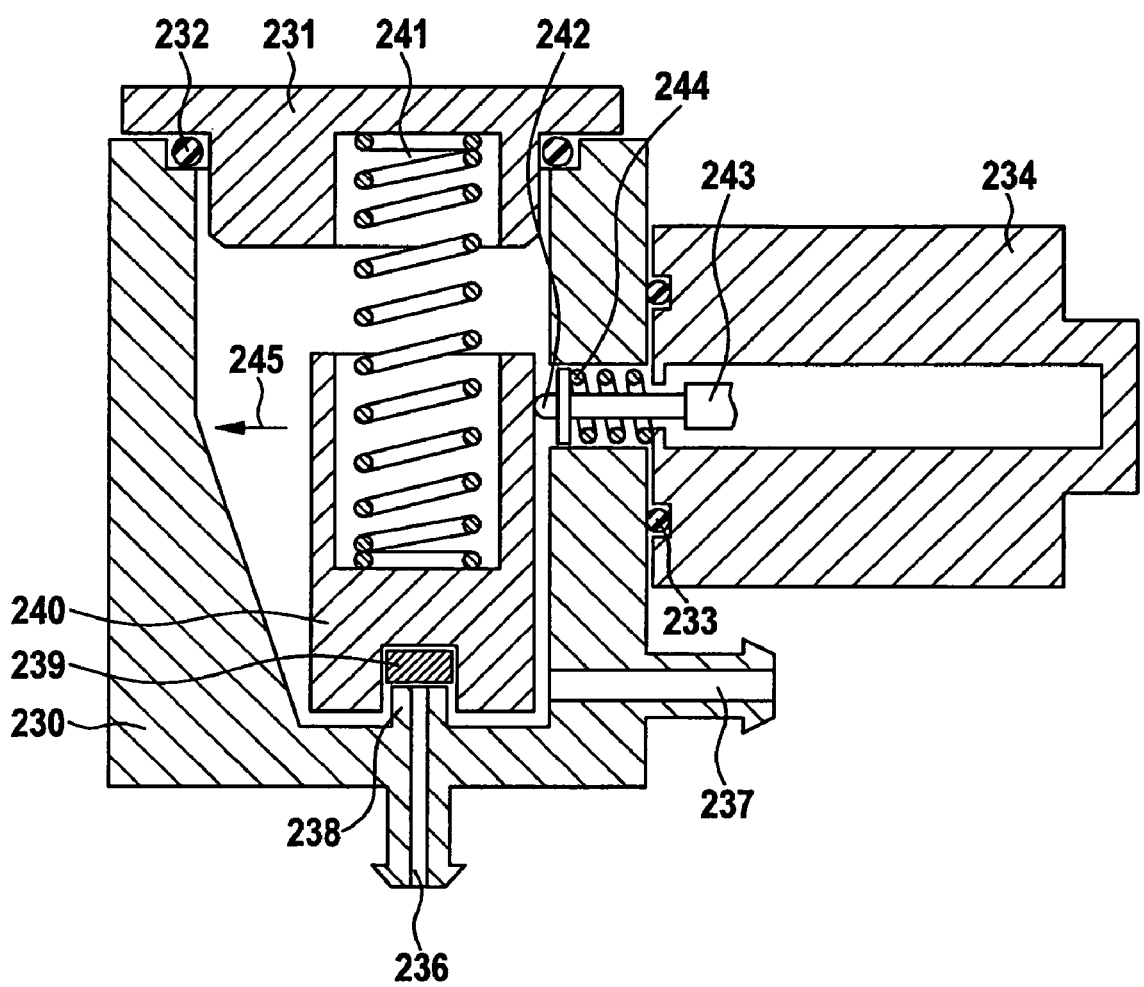
FIG. 27 an emergency release valve device having a tiltable seal-carrier device.

FIG. 27 shows an emergency release valve device having a housing 230 that is sealed by a cover member 231. Disposed between cover member 231 and housing 230 is a seal 232. Another seal 233 is disposed between housing 230 and an electromagnet 234 that includes a linear solenoid coil. Housing 230 features a pressure connection 236 for a pressure-medium line. In addition, the housing features a return connection 237 for a return line. On the inside, housing 230 has a pressure-medium inlet nozzle 238 that communicates with pressure connection 236. Pressure-medium inlet nozzle 238 is sealable by a sealing element 239 that is accommodated in a blind hole of a seal carrier 240. The inside diameter of the blind hole in seal carrier 240 is somewhat larger than the outside diameter of pressure-medium inlet nozzle 238.

A helical compression spring 241 is clamped between seal carrier 240 and cover 231 of housing 230 in such a way that sealing element 239 is pressed against pressure-medium inlet nozzle 238, in order to seal the same. Only when a predefined pressure in the pressure-medium line connected to pressure connection 236 is exceeded does sealing element 239 lift off from pressure-medium inlet nozzle 238 against the preloading force of helical compression spring 241.

Moreover, disposed radially outwardly at the end of seal carrier 240 facing away from sealing element 239 and engaging thereon is an end 242 of an actuating bolt 243. In the deenergized state of electromagnet 234, as indicated by an arrow 245, actuating bolt 243 is tilted by the preloading force of a compression spring 244 toward the inside of housing 230 in such a way that sealing element 239 lifts off from pressure-medium inlet nozzle 238. Upon energization of electromagnet 234, actuating bolt 243 is retracted to its initial position, against the preloading force of compression spring 244. In this state, with the aid of helical compression spring 241, sealing element 239 fulfills a pressure-limiting function. Upon deenergization of electromagnet 234, compression spring 244 causes actuating bolt 234 to tilt seal carrier 240 in the direction of arrow 245.

Figure 28:
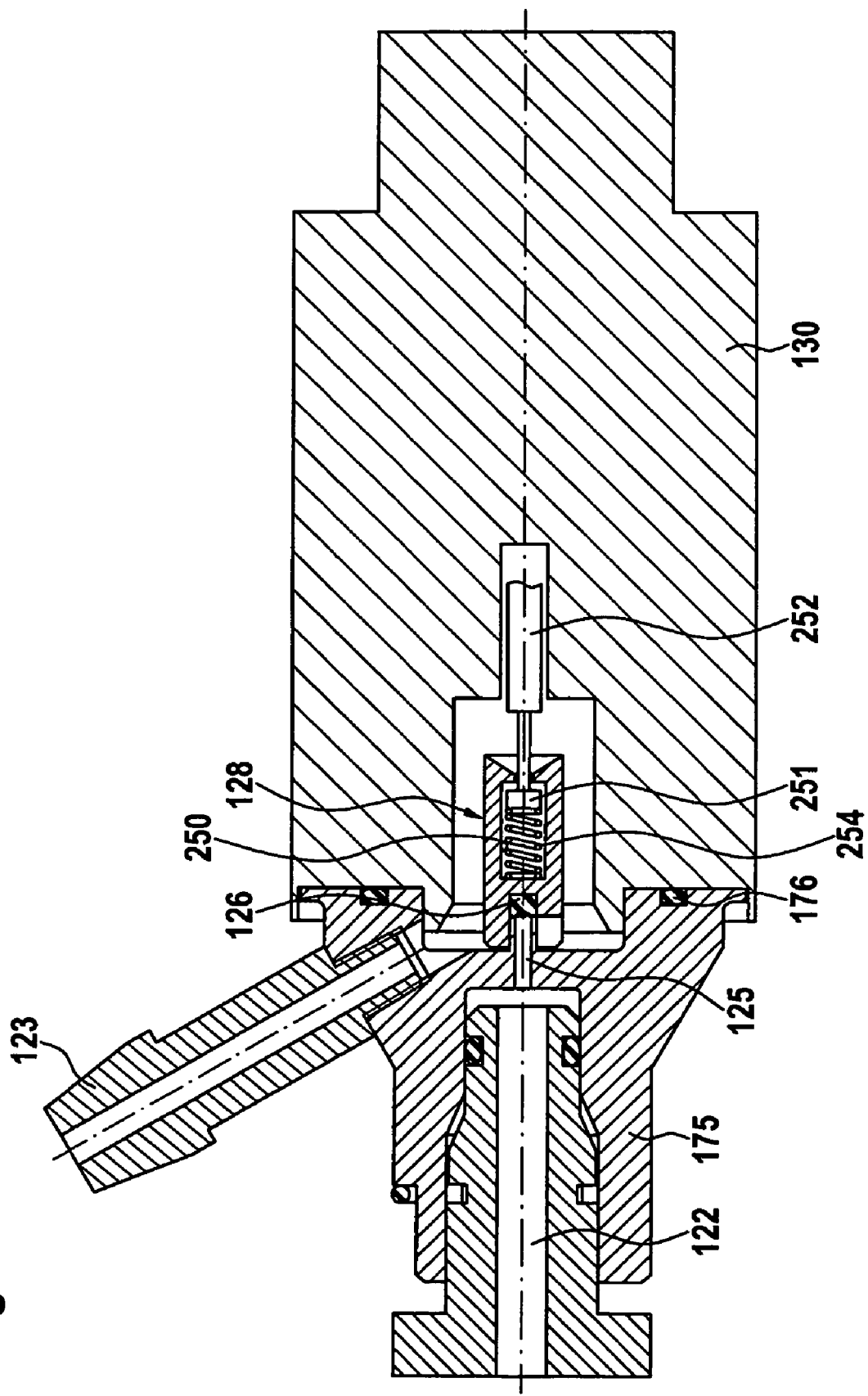
FIG. 28 an emergency release valve device similar to that in FIG. 10 and 21, having an integrated pressure-limiting valve.

FIG. 28 shows an emergency relief valve device similar to that in FIGS. 10 and 25. The same reference numerals are used to identify equivalent parts. To avoid repetitive explanations, reference is made to the preceding description of FIGS. 10 and 25. In the following, only the differences between the individual exemplary embodiments are discussed in detail.

In the exemplary embodiment shown in FIG. 28, seal-carrier device 128 has a receiving space 250 for one end 251 of an actuator 252 of electromagnet 130. Between end 251 of actuator 252 and the opposite end face of receiving space 250, a helical compression spring 254 is clamped in such a way that seal-carrier device 128, together with sealing element 126, is pressed against pressure-medium inlet nozzle 125, in order to seal the same. Only when the pressure in the pressure-medium line connected to pressure connection 122 becomes so great that the preloading force of helical compression spring 254 is overcome, does sealing element 126, together with seal-carrier device 128, lift off from pressure-medium inlet nozzle 125. Upon energization of electromagnet 130, actuator 252 presses seal-carrier device 128 via interposed helical compression spring 254 against pressure-medium inlet nozzle 125 in such a way that sealing element 126 seals pressure-medium inlet nozzle 125. Upon deenergization of electromagnet 130, seal-carrier device 128 returns to its open position in which sealing element 126 is lifted off of pressure-medium inlet nozzle 125. Moreover, in the closed state of the valve device, helical compression spring 254 makes possible the previously described pressure-limiting function.

Figure 30:
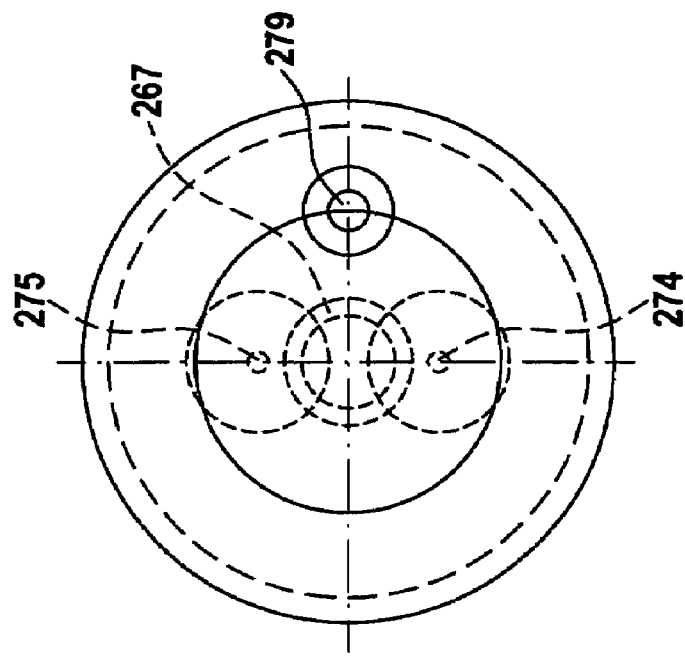
FIG. 30 a side view of the emergency release valve device from FIG. 29.
Figure 29:
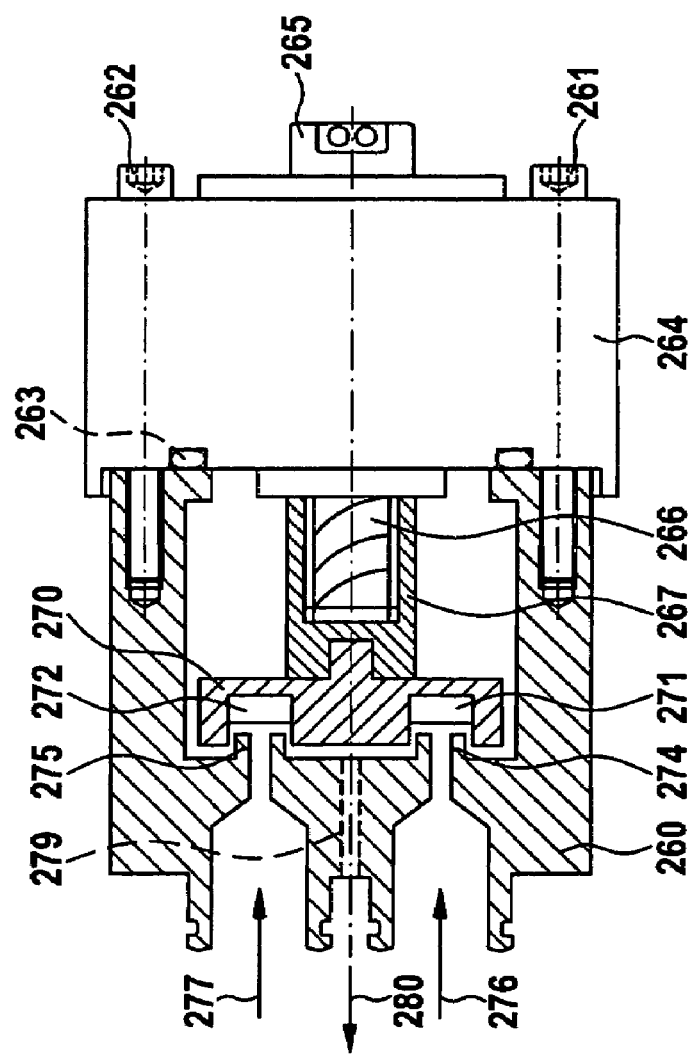
FIG. 29 an emergency release valve device having a threaded device which is disposed between a seal-carrier device and an electromagnet.

FIGS. 29 and 30 show different views of an emergency release valve device having a housing 260. Via an interposed seal 263, an electromagnet 264 is secured to housing 260 by screws 261 and 262. Electromagnet 264 has an electrical connection 265 via which it may be energized. Upon energization of electromagnet 264, an actuator 266 executes a rotary motion. Actuator 266 features an external thread that cooperates with the internal thread of a nut 267 which is screwed onto actuator 266. In the installed state, nut 267 is supported nonrotationally, but axially movable in housing 260. As a result, nut 267 executes an axial movement in response to energization of electromagnet 264.

Nut 267 is coupled to a seal carrier 270 which has two blind holes for accommodating sealing elements 271 and 272. Sealing elements 271 and 272 are used for opening or for sealing pressure-medium inlet nozzles 274 and 275. Arrows 276 and 277 indicate that pressure-medium inlet nozzles 274 and 275 communicate with pressure-medium lines that are connected to housing 260. Two dashed lines indicate a pressure-relief channel 279, which, as indicated by an arrow 280, communicates with a pressure-relief line, also described as a return line. In FIG. 30, it is discernible that, relative to pressure-medium inlet nozzles 274 and 275, which are essentially disposed in a line, pressure-relief channel 279 is offset.

Actuator 266 has a relatively large thread pitch and is set into rotation by electromagnet 264 in such a way that sealing elements 271 and 272 seal pressure-medium inlet nozzles 274 and 275. Upon deenergization of electromagnet 264, sealing elements 271 and 272 disengage from pressure-medium inlet nozzles 274 and 275, and the pressure prevailing in the pressure-medium lines is relieved via the return line.

Figure 31:
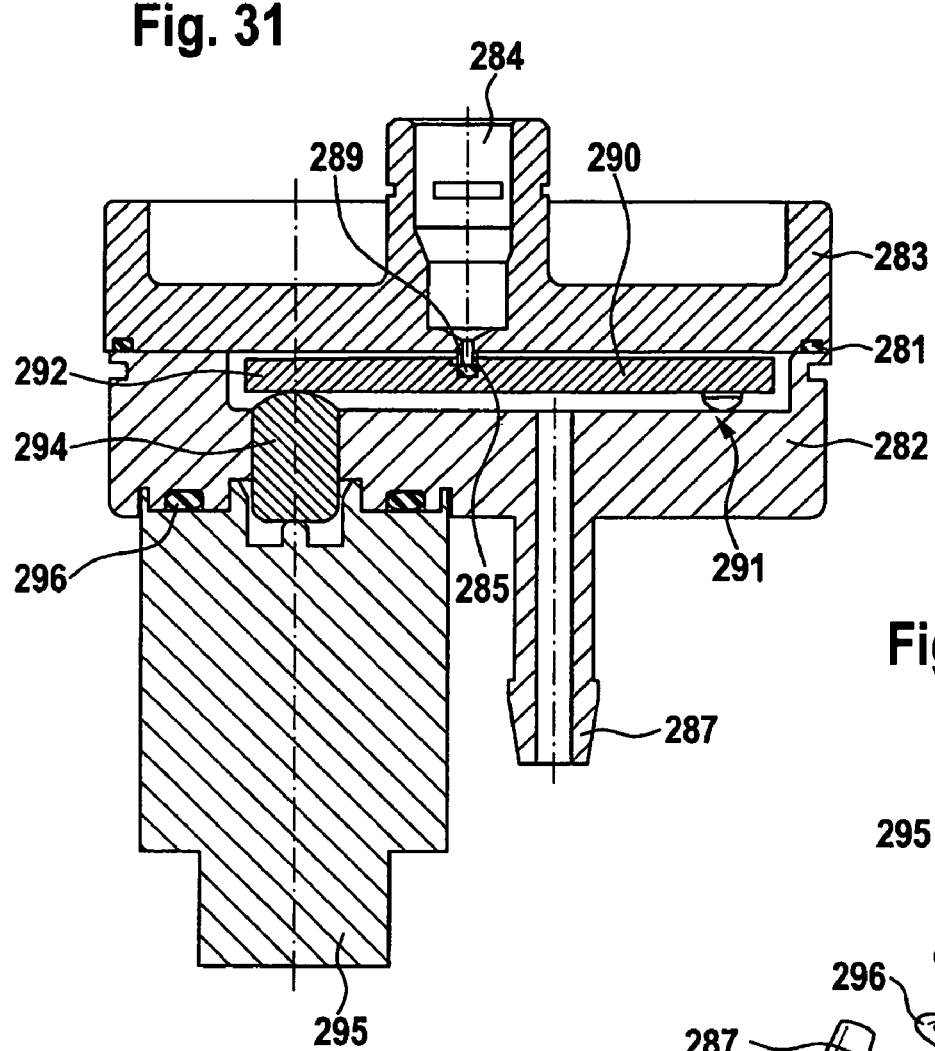
FIG. 31 an emergency release valve device having a lever-type seal-carrier device.
Figure 32:
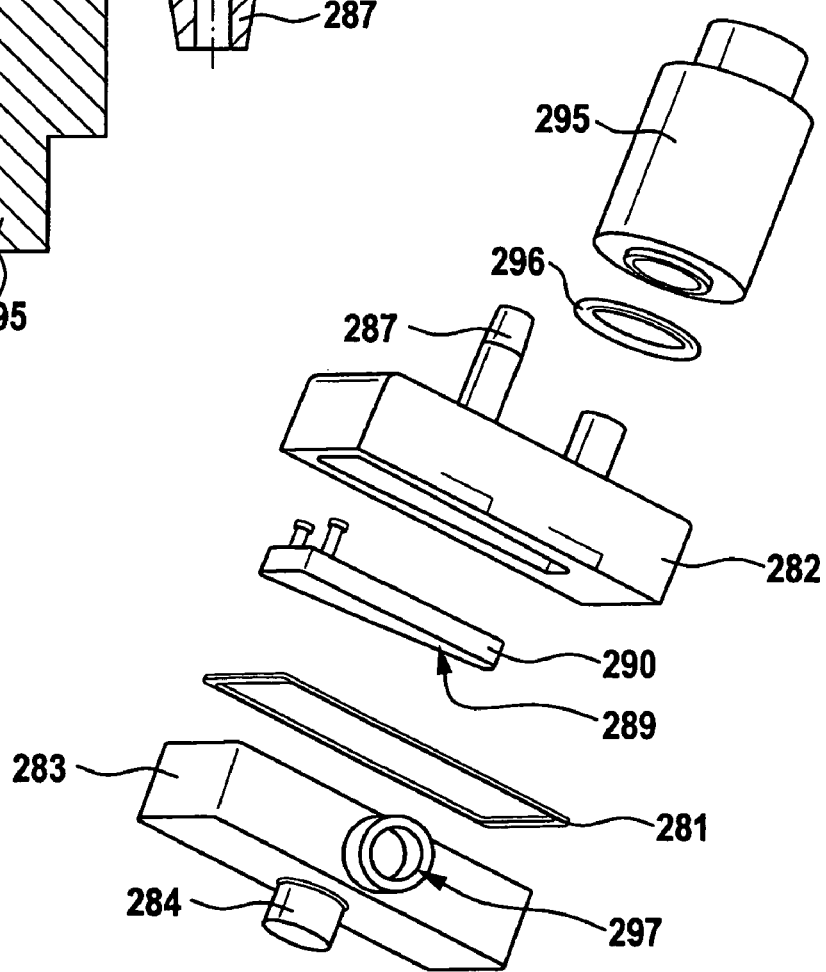
FIG. 32 an exploded view of the emergency release valve device shown in FIG. 31.

FIGS. 31 and 32 show two different views of an emergency release valve device having a housing 282. Via an interposed seal 281, a cover member 283 is secured to housing 282. Cover member 283 features a pressure connection 284 for a pressure-medium line. A pressure-medium inlet nozzle 285, which is connected to pressure connection 284, projects out from cover member 283 into the interior of housing 282.

Housing 282 features a pressure-relief connection 287 which is used for connecting a pressure-relief line, also termed return line. Pressure-medium inlet nozzle 285 is sealable by a sealing element 289 that is accommodated in a blind hole, which, in turn, has been recessed into the middle region of a lever-type seal carrier 290. At one end, lever-type seal carrier 290 has at least one bearing 291 about which lever-type seal carrier 290 is pivotable. Acting at the other end of lever-type seal carrier 290 is an actuator element 294 of an electromagnet 295. Via an interposed seal 296, electromagnet 295 is mounted in a pressure-tight manner on housing 282. In the exploded view of FIG. 32, it is discernible that cover member 283 may feature an additional pressure connection 297.

Via actuator 294, electromagnet 295 exerts a force onto end 292 of lever-type seal carrier 290 which is pivotable about bearing 291. This force is transmitted in accordance with the lever principle to sealing element 289, causing it to be pressed against pressure-medium inlet nozzle 285. Emergency release valve device shown in FIGS. 31 and 32 may be used both for single clutches, as well as for twin clutches. The illustrated seal-carrier device may be used for one or for a plurality of sealing elements. Upon deenergization of electromagnet 295, the pressure prevailing in pressure connection 284 and/or in pressure connection 297 causes lever-type seal carrier 290 to be moved back to its open position, in the process, sealing element 289 lifting off from pressure-medium inlet nozzle 285.

Figure 33:
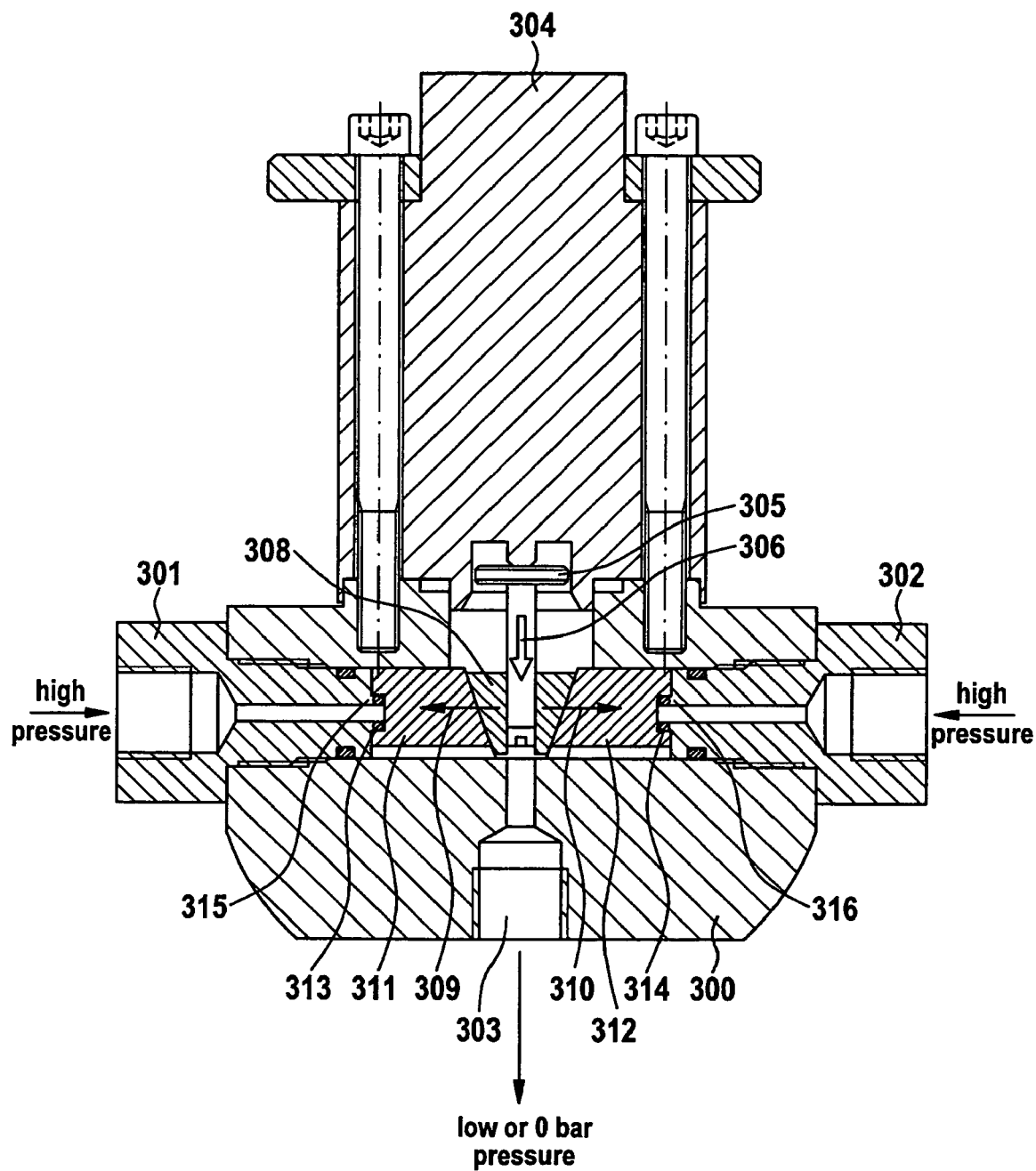
FIG. 33 an emergency release valve device having a wedge-type device for moving the seal-carrier device.

FIG. 33 shows an emergency release valve device having a housing 300 which features a pressure connection 301 and an additional pressure connection 302. Pressure connections 301 and 302 are used for connecting pressure-medium lines. Moreover, housing 300 features a pressure-relief connection 303 for connecting a pressure-relief line, also described as a return line. An electromagnet 304, which has an actuator 305, is mounted on housing 300. An arrow 306 indicates the direction of a motion executed by the actuator in response to energization of electromagnet 304.

Actuator 305 cooperates with a wedge-type device 308, which, upon energization of electromagnet 304, is pressed downwards by actuator 305, as indicated by arrow 306. Wedge-type device 308, which has a multipiece design, cooperates with seal carriers 311, 312, each of which accommodates one sealing element 313, 314. Sealing elements 313 and 314 are used for sealing pressure-medium inlet nozzles 315 and 316, which are each connected to one of pressure connections 301 and 302. As indicated by arrows 309 and 310, the seal carrier is pressed outwardly when wedge-type device 308 moves downwards in the direction of arrow 306.

Wedge-type device 308 disposed between seal-carrier devices 311 and 312 effects a linear motion of sealing elements 313 and 314 in opposite directions. The force produced by electromagnet 304 may be boosted by the angle of wedge-type device 308. In response to deenergization of electromagnet 304, seal carriers 311 and 312 and wedge-type device 308 move back to their open positions, due to the pressure prevailing in the pressure-medium lines. To lessen the influence of the frictional forces, sliding or rolling elements may be employed between wedge-type device 308 and seal-carrier devices 311 and 312.

Figure 36:
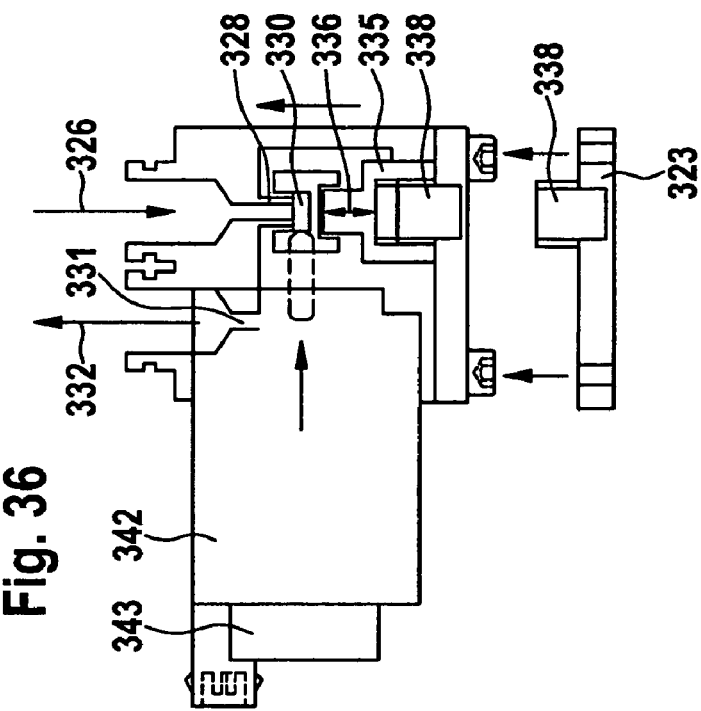
FIG. 36 the emergency release valve device from FIG. 34 and 35 in a side view.
Figure 35:
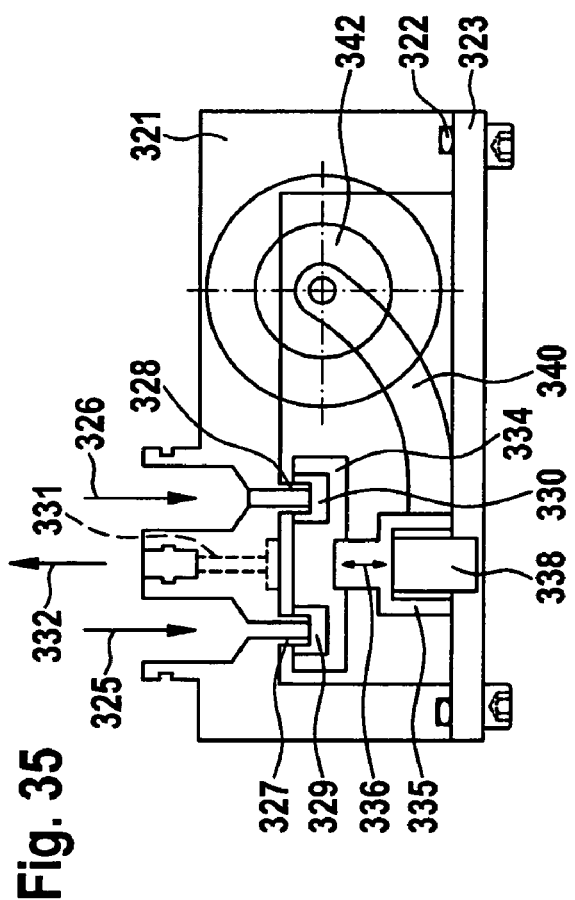
FIG. 35 the emergency release valve device from FIG. 34, in a front view.
Figure 34:
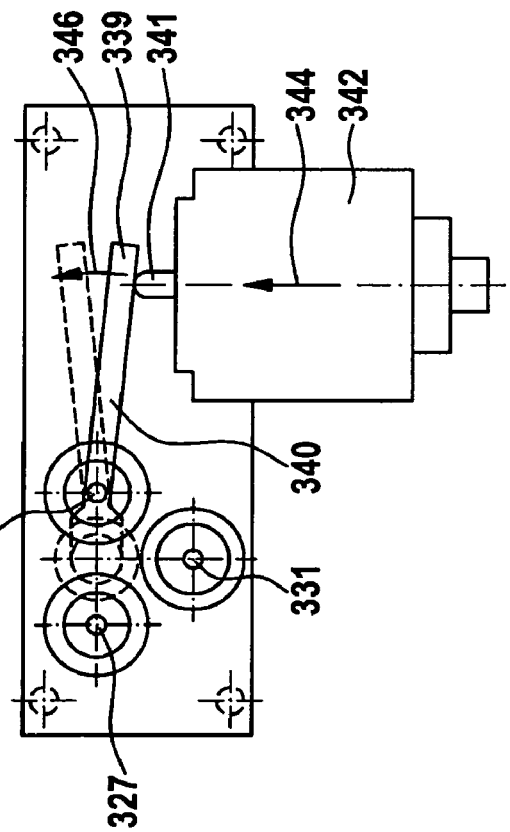
FIG. 34 an emergency release valve device having a lever-type device which cooperates with a seal-carrier device, in a plan view.

FIG. 34 through 36 show different views of an emergency release valve device having a housing 321. On its bottom side, housing 321 is sealed by a cover member 323 via an interposed seal 322. Pressure-medium lines, which are connected to housing 321, are indicated by arrows 325 and 326. The pressure-medium lines are connected to pressure-medium inlet nozzles 327 and 328, which project into the interior of housing 321. Pressure-medium inlet nozzles 327 and 328 are sealable by sealing elements 329 and 330. In addition, housing 321 has a pressure-relief connection 331, as indicated by a broken line, to which a pressure-relief line, as indicated by an arrow 332, also referred to as return line, is connectable.

Sealing elements 329 and 330 are accommodated in blind holes that are recessed into a seal carrier 334. Seal carrier 334 is coupled to an internal-thread element 335 which is movable in the direction of a double arrow 336 within housing 321. Internal-thread element 335 has an internal thread which cooperates with an external thread of an external-thread element 338 that is secured to cover member 323.

A lever arm 340, whose unattached end 339 is acted upon by an actuator element 341 of an electromagnet 342, extends out from internal thread element 335. Electromagnet 342 is mounted on housing 321 and has an electrical connection 343. Upon energization of electromagnet 342, actuator 341 executes a rotary motion in the direction of an arrow 344. This, in turn, causes unattached end 339 of lever arm 340 to move in the direction of an arrow 346 (in FIG. 34). This movement, in turn, causes internal thread element 335 to be screwed upwards on external thread element 338 in such a way that seal-carrier device 334, together with sealing elements 329 and 330, are pressed against pressure-medium inlet nozzles 327 and 328. Internal thread element 335 and external thread element 338 have a relatively large thread pitch. Pressure-medium inlet nozzles 327 and 328 which engage in seal-carrier device 334 prevent seal-carrier device 334 from turning in housing 321.

Figure 37:
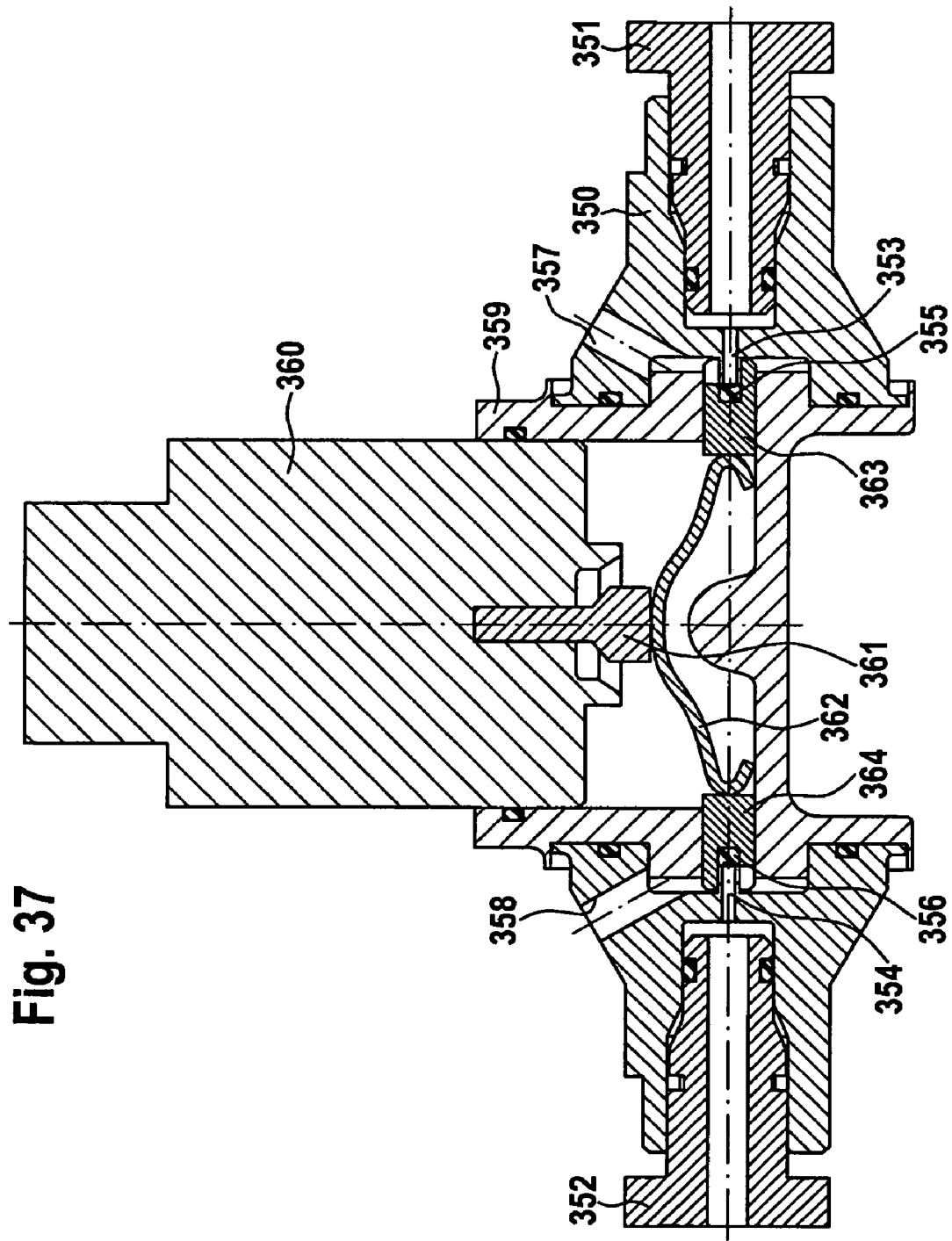
FIG. 37 an emergency release valve device having an elastic coupling device.

In FIG. 37, an emergency release valve device having a housing part 350 is shown in cross section. Housing part 350 features pressure connections 351 and 352 for connecting pressure-medium lines. Pressure connections 351 and 352 are connected to pressure-medium inlet nozzles 353 and 354, which project into the interior of housing part 350. Pressure-medium inlet nozzles 353 and 354 are sealable by sealing elements 355 and 356. Moreover, housing part 350 has pressure-relief connections 357 and 358 for pressure-relief lines, also termed return lines.

Emergency release valve device shown in FIG. 37 includes an additional housing part 359 in which a linear electromagnet 360 is installed. Electromagnet 360 actuates an actuator head 361. Actuator head 361 engages on the top side of an elastic coupling element 362. Considered in cross section, elastic coupling element 362 has two outwardly angled arms which make contact on seal-carrier devices 363 and 364. Elastic coupling element 362 is preferably made of spring steel. In response to energization of electromagnet 360, actuator head 361 presses against elastic coupling element 362, causing it to deform, and seal-carrier devices 363 and 364, together with sealing elements 355 and 356, to press against pressure-medium inlet nozzles 353 and 354. Upon deenergization of electromagnet 360, elastic coupling element 362 returns to its open position.

Figure 38:
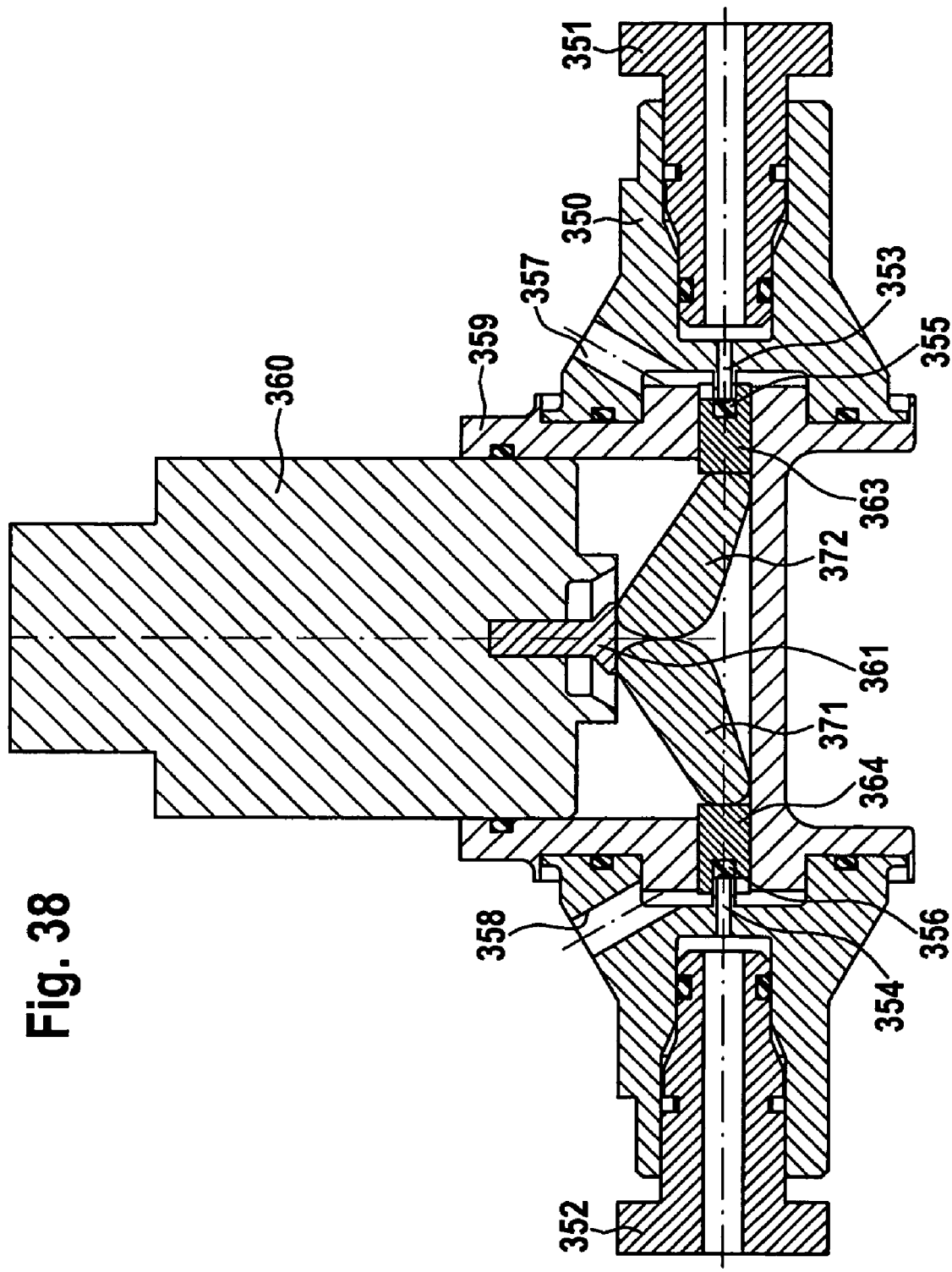
FIG. 38 an emergency release valve device having two swivel arms.
Figure 39:
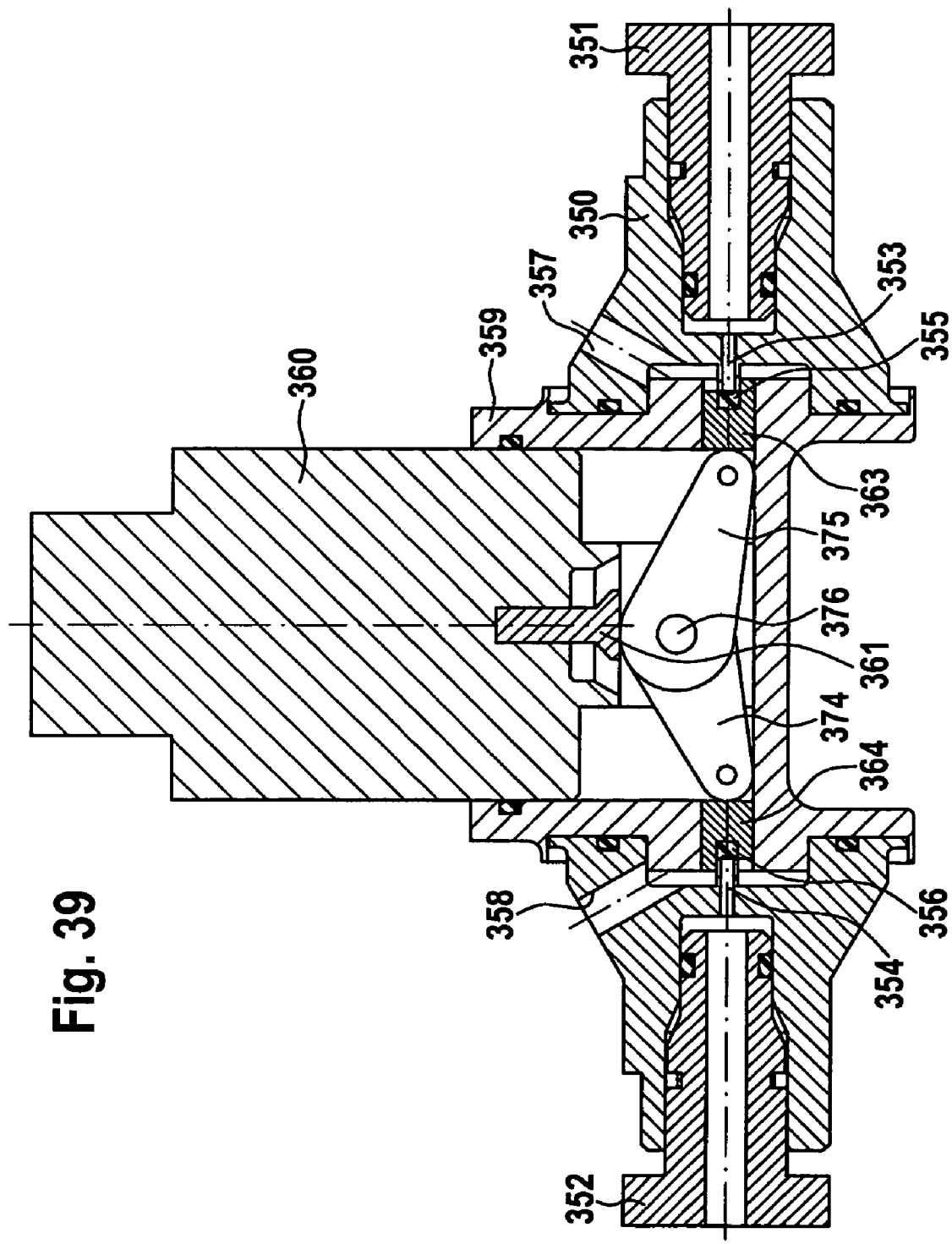
FIG. 39 an emergency release valve device having two mutually hinged swivel arms.
Figure 40:
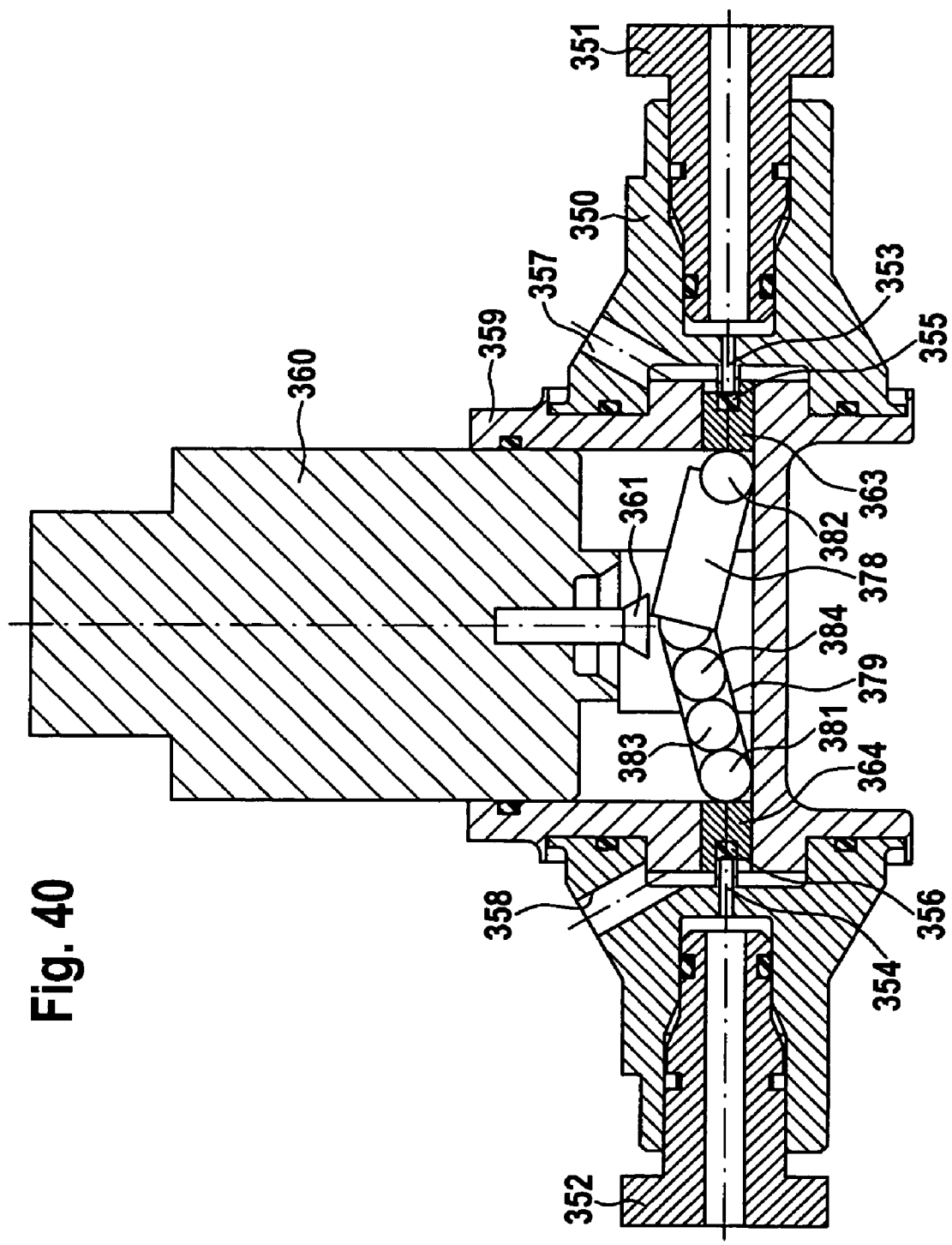
FIG. 40 an emergency release valve device having balls disposed in tubular coupling elements.

Exemplary embodiments similar to that shown in FIG. 37 are shown in FIG. 38 through 40. The same reference numerals are used to identify equivalent parts. To avoid repetitive explanations, reference is made to the preceding description of FIG. 37. In the following, only the differences between the individual exemplary embodiments are discussed in detail.

In the exemplary embodiment illustrated in FIG. 38, seal-carrier devices 363 and 364 are coupled via two coupling arms 371 and 372 to actuator head 361. In the region of actuator head 361, coupling arms 371 and 372 rest contiguously against each other as well as against actuator head 361.

In the exemplary embodiment illustrated in FIG. 39, seal-carrier devices 363 and 364 are coupled via two coupling arms 374 and 375 to actuator head 361. Coupling arms 374 and 375 are mutually hinged in the area of actuator head 361 by a joint pin 376.

In the exemplary embodiment illustrated in FIG. 40, seal-carrier devices 363 and 364 are coupled via two tubular coupling elements 378 and 379 to actuator head 361. Balls 381 through 384 are accommodated in tubular coupling elements 378 and 379. Ball 381 engages on seal-carrier device 364. Ball 382 engages on seal-carrier device 363.

Figure 41:
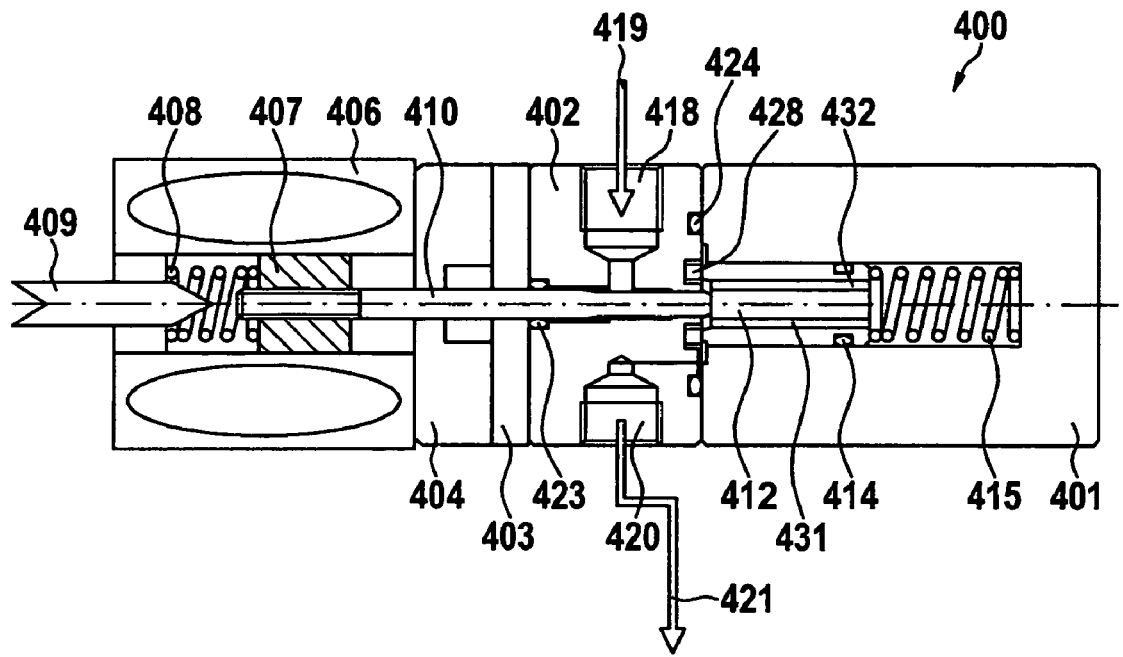
FIG. 41 an emergency release valve device having a coupling rod which is located between an actuator of an electromagnet and a plunger.

In FIG. 41, an emergency release valve device having a housing 400 is shown in cross section. Housing 400 includes a plurality of housing sections 401 through 404. An electromagnet 406 is mounted on housing section 404. Electromagnet 406 has an actuator 407, which is preloaded by an opening spring 408 in the direction of an arrow 409. Actuator 407 is coupled via a coupling rod 410 to a plunger 412, which is reciprocatingly accommodated in housing section 401. Plunger 412 is sealed radially outwardly by a seal 414 and is preloaded by a compression spring 415 which is accommodated in a blind hole that is formed in housing section 401 and is delimited by plunger 412.

Housing section 402 has a pressure connection 418 for a pressure-medium line which is indicated by an arrow 419. In addition, housing section 402 has a pressure-relief connection 420 for a pressure-relief line which is indicated by an arrow 421.

Coupling rod 410 is sealed radially outwardly from housing section 403 by a seal 423. A seal 424 is disposed between housing sections 402 and 401. At its end face facing electromagnet 406, plunger 412 has a sealing surface which is able to come into contact with a sealing element 428 in order to interrupt or close a connection between pressure connection 418 and pressure-relief connection 420.

To open the emergency release valve device shown in FIG. 41, coupling rod 410, which may be secured to actuator 407, is pressed by opening spring 408 against plunger 412, until it lifts off from sealing element 428 and pressure medium supplied via pressure connection 418 arrives at pressure-relief connection 420. To close the emergency release valve device, electromagnet 406 is energized in order to retract actuator 407. Compression spring 415 then contributes to the pressing of valve plunger 412 against sealing element 428. Valve plunger 412 features axially extending connecting channels 431 and 432 which allow pressurizing media to flow past plunger 412 and to arrive in the receiving space for compression spring 415. This ensures that the end face of plunger 412 facing away from electromagnet 406 is pressurized by pressurizing media. The pressurized surfaces at the end faces of plunger 412 are dimensioned in such a way that only a small amount of magnetic force is needed to close the emergency release valve device.

Figure 42:
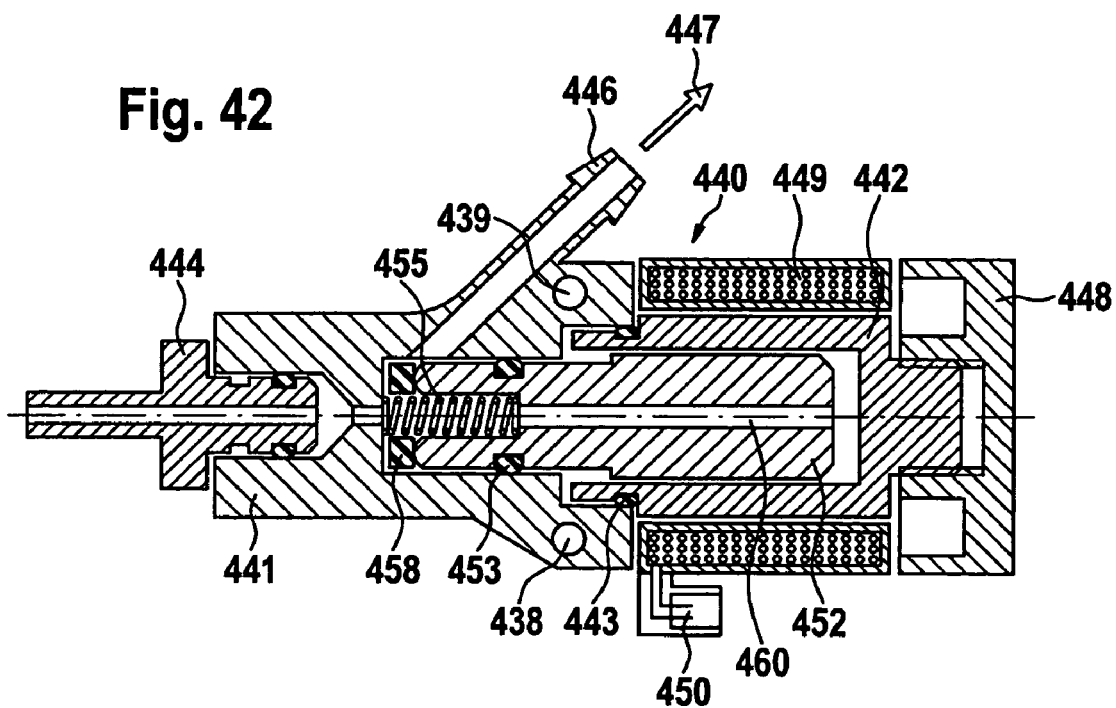
FIG. 42 a variant of the emergency release valve device shown in FIG. 41.

FIG. 42 shows an emergency release valve device having a housing 440 in cross section that includes two fastening points 438 and 439. Housing 440 has a first housing part 441 and a second housing part 442. A seal 443 is disposed between the two housing sections 441 and 442. Housing 441 features a pressure connection 444 for a pressure-medium line. Moreover, housing part 441 features a pressure-relief connection 446 for a pressure-relief line which is indicated by an arrow 447.

Screwed onto the unattached end of housing part 442 is a fastening head 448 for attaching an electromagnet 449. Electromagnet 449 has an electrical connection 450. Accommodated reciprocatingly movably in housing 440 is a plunger 452 which is sealed radially outwardly from housing part 442 by a seal 453. Plunger 452 is preloaded by an opening spring 455 into an open position. In its closed position, plunger 452 presses by a surface formed at its end facing pressure connection 444, against a ring seal 458. This interrupts the passage of pressuring medium from pressure connection 444 to pressure-relief connection 446. Plunger 452 has a central through bore 460 through which the end face of plunger 452 facing away from pressure connection 444 is pressurized by pressurizing medium.

By properly selecting the pressurized surfaces of plunger 452, it is possible to influence the magnitude of the magnetic force required to close the emergency release valve device. The smaller the difference between the pressurized surfaces is, the less is required of the magnitude of the magnetic force. The emergency release valve device is, therefore, able to seal off high pressures using a relatively small magnetic force.

LIST OF REFERENCE NUMERALS

| | |
|---|---|
| 1. | drivetrain |
| 2. | internal combustion engine |
| 3. | transmission |
| 4. | transmission actuator |
| 5. | transmission input shaft |
| 6. | transmission input shaft |
| 8. | twin clutch |
| 9. | input part |
| 10. | crankshaft |
| 11. | first clutch device |
| 12. | second clutch device |
| 15. | output part |
| 16. | output part |
| 17. | clutch disk |
| 18. | clutch disk |
| 19. | annular disk part |
| 20. | annular disk part |
| 21. | master cylinder |
| 22. | master cylinder |
| 23. | pressure-medium line |
| 24. | pressure-medium line |
| 26. | emergency release valve device |
| 27. | 4/2 directional control valve |
| 28. | electromagnet |
| 31. | connection |
| 32. | connection |
| 33. | connection |
| 34. | pressure-relief line |
| 35. | connection |
| 36. | pressure-relief line |
| 38. | pressure-relief line |
| 40. | hydraulic accumulator |
| 41. | connecting line |
| 42. | connecting line |
| 46. | emergency release valve device |
| 48. | 2/2 directional control valve |
| 49. | electromagnet |
| 50. | 2/2 directional control valve |
| 51. | electromagnet |
| 53. | connection |
| 54. | connection |
| 55. | pressure-relief line |
| 57. | connection |
| 58. | connection |
| 59. | pressure-relief line |
| 60. | connecting line |
| 61. | connecting line |
| 62. | connecting line |
| 64. | hydraulic accumulator |
| 65. | connecting line |
| 66. | hydraulic accumulator |
| 68. | connecting line |
| 69. | hydraulic accumulator |
| 71. | connecting line |
| 74. | emergency release valve device |
| 75. | electromagnet |
| 76. | 2/2 directional control valve |
| 77. | connection |
| 78. | branch line |
| 79. | branch line |
| 80. | connection |
| 81. | connecting line |
| 83. | nonreturn valve |
| 84. | nonreturn valve |
| 86. | frame structure |
| 91. | drivetrain |
| 93. | transmission |
| 94. | transmission actuator |
| 95. | transmission input shaft |
| 96. | input part |
| 97. | friction clutch |
| 98. | slave cylinder |
| 100. | pressure-medium line |
| 102. | master cylinder |
| 104. | replenishing line |
| 105. | hydraulic accumulator |
| 107. | pressure-relief line |
| 108. | emergency release valve device |
| 110. | 2/2 directional control valve |
| 111. | electromagnet |
| 114. | emergency release valve device |

| | -continued | | | -continued |
|---|---|---|---|---|
| 116. | 2/2 directional control valve | | 241. | helical compression spring |
| 117. | electromagnet | | 242. | end |
| 121. | emergency release valve device | | 243. | actuating bolt |
| 122. | connection | | 244. | compression spring |
| 123. | connection | | 245. | arrow |
| 125. | pressure-medium inlet nozzle | | 250. | receiving space |
| 126. | sealing element | | 251. | end |
| 128. | seal-carrier device | | 252. | actuator |
| 130. | electromagnet | | 254. | helical compression spring |
| 132. | connecting channel | | 260. | housing |
| 134. | double arrow | | 261. | screw |
| 135. | double arrow | | 262. | screw |
| 136. | sealing surface | | 263. | seal |
| 137. | sealing surface | | 264. | electromagnet |
| 140. | arrow | | 265. | electrical connection |
| 141. | valve ball | | 266. | actuator |
| 142. | actuator element | | 267. | nut |
| 146. | pressure-medium inlet nozzle | | 270. | seal carrier |
| 148. | O-ring seal | | 271. | sealing element |
| 149. | blind hole | | 272. | sealing element |
| 150. | seal-carrier device | | 274. | pressure-medium inlet nozzle |
| 151. | portion | | 275. | pressure-medium inlet nozzle |
| 153. | sealing element | | 276. | arrow |
| 154. | seal-carrier device | | 277. | arrow |
| 156. | arrow | | 279. | pressure-relief channel |
| 157. | arrow | | 280. | arrow |
| 158. | portion | | 281. | seal |
| 159. | portion | | 282. | housing |
| 160. | sealing element | | 283. | cover member |
| 161. | seal-carrier device | | 284. | pressure connection |
| 164. | pressure-medium inlet nozzle | | 285. | pressure-medium inlet nozzle |
| 167. | portion | | 287. | pressure-relief connection |
| 168. | sealing element | | 289. | sealing element |
| 169. | seal-carrier device | | 290. | seal carrier |
| 170. | closure member | | 291. | bearing |
| 175. | housing | | 292. | end |
| 176. | seal | | 294. | actuator |
| 180. | electromagnet | | 295. | electromagnet |
| 181. | electrical connection | | 296. | seal |
| 182. | arrows | | 297. | pressure connection |
| 183. | housing | | 300. | housing |
| 184. | seal | | 301. | pressure connection |
| 185. | pressure-medium inlet nozzles | | 302. | pressure connection |
| 186. | pressure-medium inlet nozzles | | 303. | pressure-relief connection |
| 187. | arrow | | 304. | electromagnet |
| 188. | arrow | | 305. | actuator |
| 190. | arrow | | 306. | arrow |
| 192. | seal carrier | | 308. | wedge-type device |
| 195. | sealing element | | 309. | arrow |
| 196. | sealing element | | 310. | arrow |
| 201. | seal-carrier device | | 311. | seal carrier |
| 202. | seal-carrier device | | 312. | seal carrier |
| 204. | housing | | 313. | sealing element |
| 205. | pressure connection | | 314. | sealing element |
| 206. | arrow | | 315. | pressure-medium inlet nozzle |
| 208. | connection for pressure-relief line | | 316. | pressure-medium inlet nozzle |
| 209. | arrow | | 321. | housing |
| 210. | pressure connection | | 322. | seal |
| 211. | arrow | | 323. | cover member |
| 214. | valve plunger | | 325. | arrow |
| 215. | sealing element | | 326. | arrow |
| 216. | sealing element | | 327. | pressure-medium inlet nozzle |
| 218. | electromagnet | | 328. | pressure-medium inlet nozzle |
| 219. | through channel | | 329. | sealing element |
| 220. | pressure-medium inlet nozzle | | 330. | sealing element |
| 221. | sealing element | | 331. | pressure-relief connection |
| 222. | seal carrier | | 332. | arrow |
| 224. | sealing element | | 334. | seal carrier |
| 225. | pressure-medium inlet nozzle | | 335. | internal thread element |
| 230. | housing | | 336. | double arrow |
| 231. | cover member | | 338. | external thread element |
| 232. | seal | | 339. | unattached end |
| 233. | seal | | 340. | lever arm |
| 234. | electromagnet | | 341. | actuator element |
| 236. | pressure connection | | 342. | electromagnet |
| 237. | return connection | | 343. | connection |
| 238. | pressure-medium inlet nozzle | | 344. | arrow |
| 239. | sealing element | | 346. | arrow |
| 240. | seal carrier | | 350. | housing part |

-continued

| | | |
|---|---|---|
| 351. | pressure connection | |
| 352. | pressure connection | |
| 353. | pressure-medium inlet nozzle | |
| 354. | pressure-medium inlet nozzle | |
| 355. | sealing element | |
| 356. | sealing element | |
| 357. | pressure-relief connection | |
| 358. | pressure-relief connection | |
| 359. | housing part | |
| 360. | linear magnet | |
| 361. | actuator head | |
| 362. | coupling element | |
| 363. | seal-carrier device | |
| 364. | seal-carrier device | |
| 371. | coupling arm | |
| 372. | coupling arm | |
| 374. | coupling arm | |
| 375. | coupling arm | |
| 376. | joint pin | |
| 378. | tubular coupling element | |
| 379. | tubular coupling element | |
| 381. | ball | |
| 382. | ball | |
| 383. | ball | |
| 384. | ball | |
| 400. | housing | |
| 401. | housing section | |
| 402. | housing section | |
| 403. | housing section | |
| 404. | housing section | |
| 406. | electromagnet | |
| 407. | actuator | |
| 408. | opening spring | |
| 409. | arrow | |
| 410. | coupling rod | |
| 412. | plunger | |
| 414. | seal | |
| 415. | compression spring | |
| 418. | pressure connection | |
| 419. | arrow | |
| 420. | pressure-relief connection | |
| 421. | arrow | |
| 423. | seal | |
| 424. | seal | |
| 428. | sealing element | |
| 431. | connecting channel | |
| 432. | connecting channel | |
| 438. | fastening point | |
| 439. | fastening point | |
| 440. | housing | |
| 441. | housing part | |
| 442. | housing part | |
| 443. | seal | |
| 444. | pressure connection | |
| 446. | pressure-relief connection | |
| 447. | arrow | |
| 448. | fastening head | |
| 449. | electromagnet | |
| 450. | electrical connection | |
| 452. | plunger | |
| 453. | seal | |
| 455. | opening spring | |
| 458. | ring seal | |
| 460. | through bore | |

What is claimed is:

1. A hydraulic clutch actuation system comprising:
a hydraulic clutch control device including at least one clutch master cylinder communicating via a pressure-medium line with a clutch slave cylinder used for actuating a clutch device;
at least one emergency release valve device capable of relieving a pressure prevailing in the pressure-medium line to permit disengagement of the clutch device in an emergency situation, the emergency release valve device having a seal-carrier device for a sealing element movable with the aid of an electromagnet out of an open position, a pressure-medium inlet being open in the open position, and into a closed position, the pressure-medium inlet being sealed by the sealing element in the closed position.

2. The hydraulic clutch actuation system as recited in claim 1 wherein the seal-carrier device has a blind hole for accommodating the sealing element, an inside diameter of the blind hole being larger than an outside diameter of a nozzle of the pressure-medium inlet.

3. The hydraulic clutch actuation system as recited in claim 1 wherein the seal-carrier device is tiltable in response to the electromagnet out of the open position into the closed position.

4. The hydraulic clutch actuation system as recited in claim 1 wherein the seal-carrier device includes a pressure-limiting valve.

5. The hydraulic clutch actuation system as recited in claim 1 further comprising a threaded device disposed between the seal-carrier device and the electromagnet for converting a rotary motion of the electromagnet into a translational motion of the seal-carrier device.

6. The hydraulic clutch actuation system as recited in claim 1 wherein the seal-carrier device includes a lever device.

7. The hydraulic clutch actuation system as recited in claim 1 further comprising a lever device, the seal-carrier device cooperating with the lever device, the lever device being active between the electromagnet and the seal-carrier device.

8. The hydraulic clutch actuation system as recited in claim 1 further comprising a wedge-type device, the seal-carrier device cooperating with the wedge-type device, the wedge-type device being active between the electromagnet and the seal-carrier device.

9. The hydraulic clutch actuation system as recited in claim 1 further comprising an elastic coupling device, the seal-carrier device cooperating with the elastic coupling device, the elastic coupling device being active between the electromagnet and the seal-carrier device.

10. A hydraulic clutch actuation system comprising:
a hydraulic clutch control device including one first clutch master cylinder communicating via a first pressure-medium line with a first clutch slave cylinder for actuating a first clutch device, the hydraulic clutch control device including a second clutch master cylinder communicating via a second pressure-medium line with a second clutch slave cylinder for actuating a second clutch device, a pressure prevailing in the first and/or in the second pressure-medium line being relievable via at least one emergency release valve device to permit disengagement of at least one of the first and second clutch devices in an emergency situation, the at least one emergency release valve device having a seal-carrier device for a sealing element movable with the aid of an electromagnet out of an open position, a pressure-medium inlet being open in the open position, and into a closed position, the pressure-medium inlet being sealed by the sealing element in the closed position.

* * * * *